United States Patent [19]
Ohmori

[11] Patent Number: 5,815,743
[45] Date of Patent: Sep. 29, 1998

[54] FLASH-ASSISTED PHOTOGRAPHING SYSTEM AND A DEVICE FOR USE IN THE SAME

[75] Inventor: Shigeto Ohmori, Kawachinagano, Japan

[73] Assignee: Minolta Co., Ltd., Osaka, Japan

[21] Appl. No.: 724,822

[22] Filed: Oct. 2, 1996

[30] Foreign Application Priority Data

Oct. 4, 1995 [JP] Japan ................................. 7-257919
Oct. 13, 1995 [JP] Japan ................................. 7-265960
Oct. 13, 1995 [JP] Japan ................................. 7-265961

[51] Int. Cl.$^6$ ................................................. G03B 15/02
[52] U.S. Cl. ............................................. 396/61; 396/63
[58] Field of Search ................................... 396/61, 63

[56] References Cited

U.S. PATENT DOCUMENTS 4,494,850  1/1985  Katsuma et al. .
4,746,947  5/1988  Nakai .
4,912,495  3/1990  Ishikawa et al. ............... 396/63
5,006,879  4/1991  Takagi et al. .
5,017,956  5/1991  Murata ........................... 396/61
5,159,384  10/1992  Kageyama et al. .

FOREIGN PATENT DOCUMENTS 3-233524  10/1991  Japan .

*Primary Examiner*—Russell E. Adams
*Attorney, Agent, or Firm*—Burns, Doane, Swecker & Mathis, LLP

[57] ABSTRACT

A flash-assisted photographing system including a camera having a taking lens capable of varying the focal length and a flash is provided with a light receiving unit having a plurality of receiving areas operable to separately receive light reflected by different areas of a photographic view, a detector operable to detect a focal length of the taking lens, and a controller operable to set weights for the receiving areas based on a detected focal length. Proper weights are set for the receiving areas even in the case of close-up photography which is highly influenced by camera shake. A main subject can be reliably exposed at a proper light emission.

18 Claims, 17 Drawing Sheets

FLASH-ASSISTED PHOTOGRAPHING SYSTEM AND A DEVICE FOR USE IN THE SAME

BACKGROUND OF THE INVENTION

This invention relates to a flash-assisted photographing system, particularly to a flash-assisted photographing system which controls the amount of flash light to be emitted or flash firing amount in accordance with respective light amounts in a plurality of divided areas of a photographic view, and also a flash-assisted photographing system which enables a combination of a so-called flashmatic control of controlling the flash firing amount based on a distance to an object and a set aperture value and a light adjustment control of controlling the flash firing amount based on a measured light amount of the object to perform flash-assisted photography, and further a flash-assisted photographing system which enables a combination of a so-called flashmatic control of controlling the flash firing amount based on a distance to an object and a set aperture value and a multi-spot light adjustment control of controlling the flash firing amount in accordance with respective light amounts in a plurality of divided areas of a photographic view to perform flash-assisted photography, and moreover a device such as camera and flash for use in a flash-assisted photographing system.

There have been proposed multi-spot light adjustment control as an exposure control for flash-assisted photography. In the multi-spot light adjustment control, a photographic view is divided into a plurality of areas, and light amounts from respective areas are measured. The flash light amount is adjusted based on measured light amounts from the respective areas to assure proper exposure of a main object. The following publications disclose exemplary multi-spot light adjustment controls.

Japanese Unexamined Patent Publication Nos. 61-194430 and 61-215537 disclose a multi-spot light adjustment control in which a control brightness is calculated from a brightness at a center portion of a photographic view and a brightness at a peripheral portion of the photographic view, the brightness being measured at the time of locking the auto-exposure or detecting the focus condition, thereby adjusting the flash light amount in accordance with the calculated control brightness to properly expose a whole portion of the photographic view while the main object is positioned at the center of the view.

Japanese Unexamined Patent Publication No. 2-87127 discloses a multi-spot light adjustment control in which the amount of natural light is measured before firing the flash, and the light amount is adjusted for respective divided areas based on the natural light amount to assure a proper exposure of an object partially having a high bright portion.

Japanese Unexamined Patent Publication No. 3-233524 discloses a multi-spot light adjustment control in which focus condition is checked for respective divided areas, and weighting is uniformly applied to all the divided areas to provide uniform flash light over the photographic view to assure proper exposure of a main object when every area is detected not to be in the focus condition.

As mentioned above, the multi-spot light adjustment is carried out to assure proper exposure of a main object by dividing the photographic view into a plurality of areas, and adjusting flash light amounts with respect to respective divided areas. To perform accurate multi-spot light adjustment, however, it is necessary to detect the position of a main object in the photographic view and the distance to the main object precisely.

The multi-spot light adjustment control shown in Japanese Unexamined Patent Publication Nos. 61-194430 and 61-215537 determines a control brightness based on a brightness at a center portion and a brightness at a peripheral portion on the assumption that the main object is usually in a center of the photographic view. Accordingly, this control cannot provide proper light adjustment in the case that a main object is not in a center or in the case that an accurate measurement of distance to an object cannot be attained.

The multi-spot light adjustment control shown in Japanese Unexamined Patent Publication No. 2-87127 adjusts the light amount so as to reduce or eliminate the influence of excessive light, e.g., sun light in the daylight-synchronized photography. This control does not consider the position of a main object and the distance to the main object. Accordingly, this control cannot reliably provide proper light adjustment for a variety of photography conditions.

The multi-spot light adjustment control shown in Japanese Unexamined Patent Publication No. 3-233524 requires the detection of respective focus conditions with respect to divided areas. This makes the exposure operation more complicated. A reference area for the multi-spot light adjustment is placed on an area having a high focus accuracy. Accordingly, proper light adjustment is hard to be accomplished in the case that a main object is not in the high focus accuracy area.

In these conventional multi-spot light adjustment controls, further, a light adjustment level is determined in the auto-focus processing. Accordingly, the proper light adjustment cannot be assured for an object moved after the determination of light adjustment level.

As flash light emission control for cameras, moreover, there has been known the flashmatic control in addition to the light adjustment control.

In the flashmatic control (hereinafter, "FM control"), a guide number of a flash device is calculated based on a specified information such as an object distance and a set aperture value, and a light emission period is controlled based on the calculation result so as to control a flash firing amount. This control is influenced by the reflectance of the object and the background with less likelihood, but is largely influenced by a distance measurement precision and an aperture precision. Especially, in the case that a short focal length lens is used, the distance measurement result largely varies depending upon a fine error of a lens projection amount. As a result, the calculated guide number of the flash device has a low reliability.

On the other hand, in the light adjustment control, the flash firing amount is controlled in real time based on the flash light reflected by the object. This control is influenced by the distance measurement precision and the aperture precision with little likelihood, but is largely influenced by the reflectance of the object and the background.

Both flash firing controls have advantages and disadvantages, and it is difficult to perform an optimal flash light emission control for every photographic view and under every photographing condition. In order to solve such a problem, a flash-assisted photographing system adopting a combination of both flash firing controls has been proposed.

For example, Japanese Unexamined Patent Publication No. 58-223125 discloses a flash-assisted photographing system which adopts the FM control to control the flash firing when the focal length of the lens used is longer than a predetermined focal length (telephoto lens) while adopting the light adjustment control when the focal length of the lens used is shorter than the predetermined focal length (wide angle lens).

Also, Japanese Unexamined Patent Publication No. 58-224334 discloses another flash-assisted photographing system which has a first mode for controlling the flash firing by the FM control and a second mode for controlling the flash firing by the light adjustment control, and in which the first mode is automatically selected when a filter, intermediate adapter or like accessory having a characteristic of varying an amount of transmission light (transmission light amount varying characteristic) is mounted on the lens.

Further, Japanese Unexamined Patent Publication No. 3-149535 discloses a flash-assisted photographing system which controls the flash firing by the FM control when the object distance is shorter than a predetermined distance, while controlling it by the light adjustment control when the object distance is longer than the predetermined distance.

These conventional controlling devices are basically designed to perform a suitable flash firing control by controlling the flash firing by switching the control between the FM control and the light adjustment control so as to compensate for a reduced precision of the FM control due to a light measurement error, a focusing error or the mounting of an accessory having a transmission light amount varying characteristic. Accordingly, when the compensation conditions are satisfied, this controlling device can perform a more precise flash firing control than the other controlling device adopting only one of the controls.

However, there are a variety of photographic views and photographing conditions of the flash-assisted photography, and cases where a suitable exposure control is performed by the FM control and cases where a suitable exposure control is performed by the light adjustment control are not necessarily clearly distinguishable. Thus, if it cannot be clearly determined which control should be preferably used, the prior art exposure control by the switching method may not be necessarily effective.

Also, in the case that the light adjustment control is selected and a main object stands in front of a high reflective wall and the high reflective wall is covered by light adjustment areas for the multi-spot light adjustment, light is exceedingly reflected from the high reflective background wall and an adjustment control value is set blow a proper value, resulting in an insufficient exposure for the main object. Under the multi-spot light adjustment control, conversely, in the case that a main object stands in front of a low reflective wall, and the low reflective wall is covered by multi-spot light adjustment areas, the light reflection of the background wall is too low and an adjustment control value is set above a proper value, resulting in an excessive exposure for the main object.

Accordingly, even in the switchable combination of the FM control and the light adjustment control using the multi-spot light adjustment, to assure proper flash exposure, it is preferable to take into consideration a relationship between light adjustment areas and a photographic view as well as the operation state of taking lens.

Further, in the switchable combination of the FM control and the light adjustment control, these two controls are independent of each other. Accordingly, each control cannot sufficiently compensate for the disadvantages of the other. For example, in the case that a control error occurs in the FM control, this control error directly influences the flash firing, with the result that a suitable exposure cannot be obtained. Similarly, in the case that the reflectance of the object is not suitable for the light adjustment control, a light adjustment level deviates from a suitable level, making it difficult to obtain a proper exposure.

SUMMARY OF THE INVENTION

It is an object of the present invention to provide a flash-assisted photographing system which has overcome the problems residing in the prior art.

It is another object of the present invention to provide a device for use in a flash-assisted photographing system which has overcome the problems residing in the prior art.

It is still another object of the present invention to provide a flash-assisted photographing system and a device for use in the same system which can perform flash firing control more properly.

It is yet still another object of the present invention to provide a flash-assisted photographing system and a device for use in the same system which can assure more proper flash firing control by switching over FM control and multi-spot light adjustment control in accordance with a relationship between light adjustment areas and a photographic view.

It is yet still another object of the present invention to provide a flash-assisted photographing system and a device for use in the same system which can assure more proper flash firing control by adjusting weights for respective light adjustment areas in accordance with the position, size, and movement of a main object in a photographic view.

According to one aspect of the present invention, a flash-assisted photographing system including a camera provided with a taking lens capable of varying the focal length and a flash. The flash-assisted photographing system comprises: a light receiving unit having a plurality of receiving areas operable to separately receive light reflected by different areas of a photographic view; a detector operable to detect a focal length of the taking lens; and a controller operable to set weights for the receiving areas based on a detected focal length.

The flash-assisted photographing system may be further provided with a distance detector operable to detect a distance to an object; and a calculator operable to calculate a magnification from a detected focal length and a detected object distance. In this case, the controller sets weights for the receiving areas based on a calculated magnification.

The controller may be made to set weights for the receiving areas in accordance with a product of a detected focal length and a calculated magnification.

The flash-assisted photographing system may be further provided with a light measuring unit operable to measure a brightness of a center of the photographic view at a first timing predetermined time before an exposure and at a second timing closer to the exposure than the first timing, a discriminator operable to discriminate based on light measurements of the light measuring unit whether an object has moved, and a corrector responsive to the discriminator and operable to correct a product of a detected focal length and a calculated magnification when the object is discriminated to have moved.

The flash-assisted photographing system may be further provided with a light measuring unit operable to measure respective brightness of different areas of the photographic view at a first timing predetermined time before an exposure and at a second timing closer to the exposure than the first timing; a first calculating unit operable to calculate a brightness of a main object from respective light measurements obtained at the first timing, a second calculating unit operable to calculate respective brightnesses of areas corresponding to the receiving areas of the light receiving unit from respective light measurements obtained at the second timing, and a corrector operable to correct weights for the receiving areas based on a calculated brightness of the main object and calculated brightnesses of areas corresponding to the receiving areas.

With thus constructed flash-assisted photographing system, there is provided the detector to detect a focal length of a taking lens. Weights for the receiving areas are set based on a detected focal length. This will assure proper weighting for the receiving areas even in the case of close-up photography which is highly influenced by camera shake, and a main subject can thus be reliably exposed at a proper light emission.

Also, a magnification is calculated from a detected focal length and a detected object distance, and weights for the receiving areas are set based on a calculated magnification. Further, weights for the receiving areas are set in accordance with a product of a detected focal length and a calculated magnification. These make it possible to precisely control the flash light emission in accordance with a variation in the size of main subject in the photographic view.

Furthermore, a brightness of a center of the photographic view is measured at a first timing predetermined time before an exposure and at a second timing closer to the exposure than the first timing and it is discriminated whether an object has moved. When the object is discriminated to have moved, a product of a detected focal length and a calculated magnification is corrected. Also, a brightness of a main object is calculated from respective light measurements obtained at the first timing and respective brightnesses of areas corresponding to the receiving areas of the light receiving unit are calculated from respective light measurements obtained at the second timing. Weights for the receiving areas are corrected based on a calculated brightness of the main object and calculated brightnesses of areas corresponding to the receiving areas. These make it possible to reliably perform proper exposure even if an object moves immediately before an exposure is started.

According to another aspect of the present invention, a flash-assisted photographing system including a camera capable of varying the aperture and a flash, comprises: a first flash stop timing setting unit operable to set a first flash stop timing based on a distance to an object and an aperture; a second flash stop timing setting unit operable to set a second flash stop timing based on an amount of flash light reflected by an object; and a flash stopping unit operable to stop the firing of the flash in accordance with the set first and second flash stop timings.

The flash stopping unit may stop the firing of the flash at earlier one of the first and second flash stopping timings. Alternatively, the flash stopping unit may stop the firing of the flash at later one of the first and second flash stopping timings.

The flash-assisted photographing system may be further provided with a corrector operable to correct the first and second flash stopping timings in accordance with a distance to an object.

The flash-assisted photographing system may be further provided with a detector operable to detect a focal length of the taking lens, a distance detector operable to detect a distance to an object, a calculator operable to calculate a magnification from a detected focal length and a detected object distance, and a corrector operable to correct the first and second flash stopping timings in accordance with a product of the detected focal length and a calculated magnification.

With thus constructed flash-assisted photographing system, there are provided the first flash stop timing setting unit to set a first flash stop timing based on a distance to an object and an aperture and the second flash stop timing setting unit to set a second flash stop timing based on an amount of flash light reflected by an object. The firing of the flash is stopped in accordance with the set first and second flash stop timings. Accordingly, as compared with the conventional flash controlling devices in which the flash firing is stopped by either one of the flashmatic control and the light adjustment control, proper exposure can be reliably attained for a variety of flash light reflecting conditions.

Also, the first and second flash stop timings are corrected in accordance with a distance to an object. This can assure proper exposure even in the case that a diffusion plate is used in macro-photography.

Further, the first and second flash stop timings are corrected in accordance with a product of a focal length and a magnification. This can eliminate a possible deviation in the flash light emission amount from a proper level that is liable to occur due to a variation in the drive control of the taking lens or in the flash light reflecting condition, thus ensuring a proper exposure.

According to still another aspect of the present invention, a flash-assisted photographing system including a camera provided with a taking lens capable of varying the focal length and a flash, comprising: a distance detector operable to detect a distance to an object; a first controller operable to control the light emission amount of the flash based on a detected object distance and a set aperture; a light receiving unit having a plurality of receiving areas operable to separately receive light reflected by different areas of a photographic view; a weight setting unit operable to set weights for the receiving areas; a second controller operable to control the light emission amount of the flash based on an average of weighted reception light amounts of the receiving areas; a focal length detector operable to detect a focal length of the taking lens; a magnification calculator operable to calculate a magnification from a detected focal length and a detected object distance: and a third controller operable to control the first and second controllers to allow the second controller to work when a calculated magnification is above a magnification threshold value.

The weight setting unit may be able to selectively set one of a plurality of weight patterns for the receiving areas, further comprising a magnification threshold setting unit operable to set a magnification threshold in accordance with a selected weight pattern.

The flash-assisted photographing system may be further provided with a control mode setting unit operable to set one of a plurality of control modes for the second controller and the weight setting unit may be made to set one of the plurality of weight patterns based on a set control mode.

The flash-assisted photographing system may be further provided with a taking lens information detector operable to detect information on a characteristic performance of the taking lens that influences a relationship between the receiving areas and a light object image passed through the taking lens and the weight setting unit may be made to set one of the plurality of weight patterns based on detected information.

The flash-assisted photographing system may be further provided with a print format setting unit operable to set a print format and the weight setting unit may be made to set one of the plurality of weight patterns based on the set print format.

The flash-assisted photographing system may be further provided with a comparator operable to compare a detected object distance to a predetermined object distance threshold value and the third controller may be made to control the first and second controllers to allow the second controller to work when a calculated magnification is below a magnification threshold value and a detected object distance is above the predetermined object distance threshold value.

With thus constructed flash-assisted photographing system, there are provided the first controller operable to control the light emission amount of the flash based on a detected object distance and a set aperture and the second controller operable to control the light emission amount of the flash based on an average of weighted reception light amounts of the receiving areas. When a calculated magnification is above a magnification threshold value, the second controller is put in operation. Accordingly, even in a photographic view largely influenced by a background, e.g., a person standing against a high or low reflective background, proper exposure can be reliably performed in consideration of the receiving area for light adjustment and the photographic view.

Also, an appropriate weight pattern for receiving areas can be selectively set. The magnification threshold value is changed according to a set weight pattern. Accordingly, the selection of the first or second controller can be reliably performed in accordance with a set weight pattern, thus assuring a proper flash exposure.

Further, an appropriate control mode for the second controller can be set. A weight pattern is determined based on a set control mode. Also, information on a characteristic performance of the taking lens that influences a relationship between the receiving areas and a light object image passed through the taking lens is detected and a weight pattern is then determined based on detected information. Further, a weight pattern is determined based on a set print format. These will increase the precision in the flash control.

Further, when the magnification is below a magnification threshold value and a detected object distance is above a predetermined distance threshold value, the second controller is performed. Accordingly, even in a photographic view where an actual light adjustment area is influenced by a background, the light adjustment control can be properly performed in the case of close-up photography in which the orientation characteristic of flash light is deteriorated.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
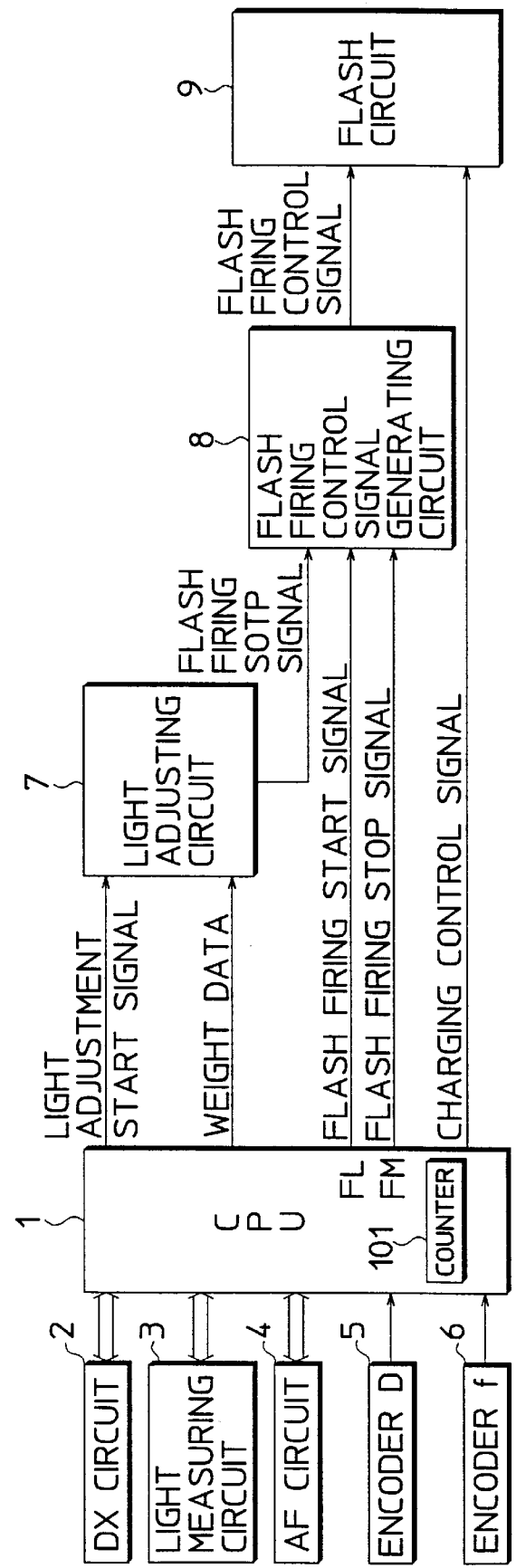
FIG. 1 is a block diagram of a control system of a flash-assisted photographing system embodying the present invention.

FIG. 1 is a block diagram of a control system of a flash-assisted photographing system embodying the present invention.

In FIG. 1, a CPU 1 is a control circuit including a microcomputer for centrally controlling the photographing operation of a camera. The camera has a flash firing control function by the FM control and a flash firing control function by the light adjustment control adopting a TTL (through the lens) direct light measuring method. The CPU 1 also controls a flash firing timing and a flash firing amount of a flash circuit 9 by the FM control and the light adjustment control.

The CPU 1 has a built-in counter 101 for counting a flash firing stop timing in the FM control.

A DX circuit 2 reads a DX code affixed to a film container by optical means, magnetic means or the like. The DX code includes a data representing a film sensitivity (ISO sensitivity).

Figure 3:
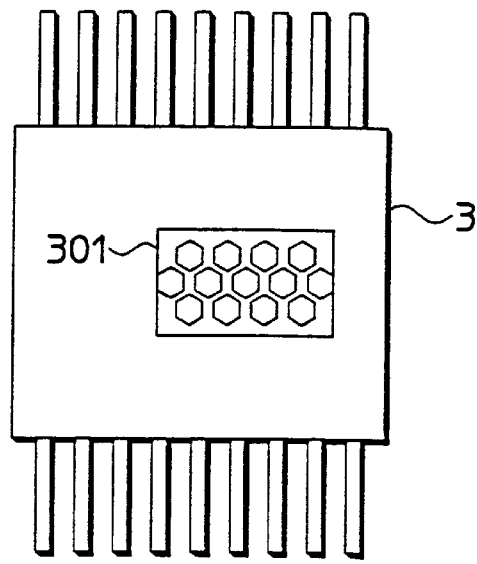
FIG. 3 is a diagram showing a light measuring circuit.

The light measuring circuit 3 measures the brightness of an object. The circuit 3 includes a multi-spot light measuring sensor for performing a light measurement after dividing a photographic view into a plurality of areas, and outputs light measurement data obtained in the respective divided areas. The circuit 3 includes an IC chip formed with a light measurement window (light measurement area) 301 divided into 14 light measurement areas S0 to S13 as shown in FIG. 3, and is provided in an upper part of a viewfinder optical system 12 of a camera 10.

Figure 5:
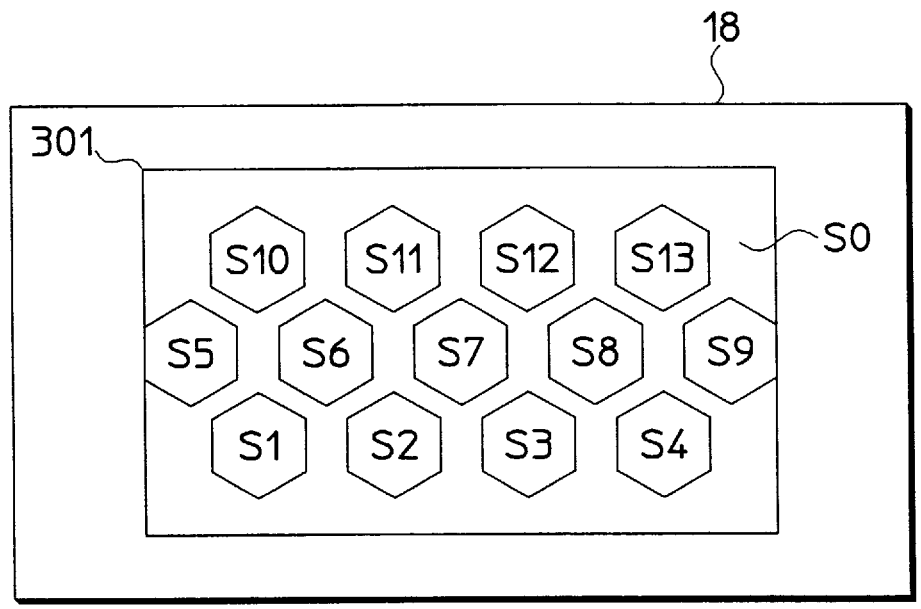
FIG. 5 is a diagram showing respective divided areas of a multi-spot light measuring circuit and light measurement positions within a viewfinder frame.

As shown in FIG. 5, 13 hexagonal light measurement areas S1 to S13 are arranged in the same manner as a honeycomb within the rectangular light measurement area 301, and an area enclosing these light measurement areas S1 to S13 is the light measurement area S0. The light measuring circuit 3 is arranged such that light measurement is performed for an image substantially in the center of a viewfinder frame 18.

The CPU 1 calculates an exposure control value based on the film sensitivity and the light measurement data input from the light measuring circuit 3. The light measurement data are also used to control the flash firing in the flash circuit by the light adjustment control. The CPU 1 calculates weight data to be fed to a light adjusting circuit 7 described later. The calculation of the weight data is described later.

Figure 6:
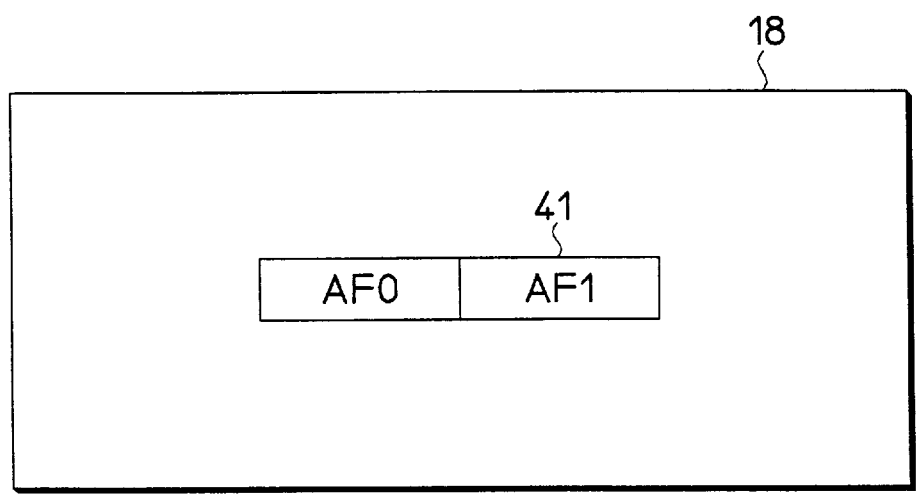
FIG. 6 is a diagram showing light measurement positions within the viewfinder frame of an automatic focusing (AF) sensor.

An AF circuit 4 automatically adjusts the focusing condition of the taking lens 11 according to a phase difference detecting method. The circuit 4 includes an AF sensor 41 for picking up the image substantially in the center of the viewfinder frame 18 after separating it into two as shown in FIG. 6.

Figure 2:
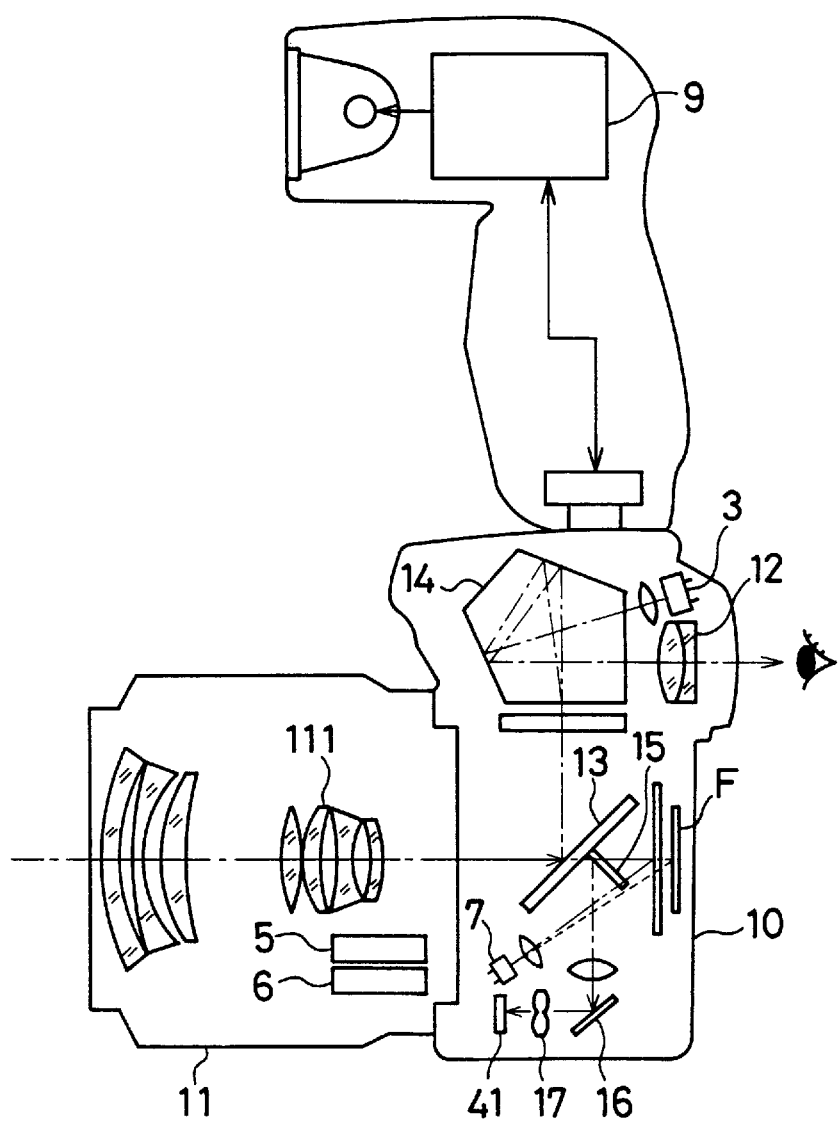
FIG. 2 is a diagram showing a positional relationship of various sensors and a flash circuit provided in a camera.

As shown in FIG. 2, the AF circuit 4 is disposed, below a main mirror 13, in a focusing position equivalent to a film surface F with respect to a taking lens 11. A part of a light image having transmitted through the taking lens 11 and the main mirror 13 is reflected downward by a sub-mirror 15 disposed behind the main mirror 13, and further introduced to the AF sensor 41 by a mirror 16.

A separator lens 17 is disposed between the AF sensor 41 and the mirror 16, so that the light image is focused on a reference portion AF0 and a comparison portion AF1 of the AF sensor 41 after being separated by the separator lens 17.

The AF circuit 4 calculates a focusing data based on a displacement of the focused positions of a reference image picked up by the reference portion AF0 and a comparison image picked up by the comparison portion AF1, and outputs the calculation result to the CPU 1. The CPU 1 moves a focusing lens group 111 of the taking lens 11 based on the obtained focusing data to automatically obtain an in-focus condition.

Although a single metering method using a signal AF sensor 41 is adopted in this embodiment, a multi-metering method using a plurality of AF sensors may be adopted.

An encoder S detects an object distance D. The encoder 5 includes a bit mark member including bits coding, e.g., positions and a reader for reading the information represented by the respective bits of the bit mark member. The bit mark member and the reader are so arranged at a stationary side (barrel side) and a rotatable side (side where the lens is driven to attain an in-focus condition) of the taking lens 11. The encoder 5 outputs a distance information corresponding to a projected amount of the lens group 111 as a code data to the CPU 1.

An encoder 6 detects a focal length f. The encoder 6 has a construction similar to that of the encoder 5, and outputs an information corresponding to the focal length f of the taking lens 11 as a code data to the CPU 1.

The light adjusting circuit 7 detects the flash firing stop timing of the flash circuit 9 by the TTL direct light measuring method. The circuit 7 includes a multi-spot light adjusting sensor for dividing the photographic view into a plurality of areas and receiving the flash light reflected by the object. The circuit 7 detects the flash firing stop timing of the flash circuit 9 based on amounts of received light in the respective divided areas (hereafter, light adjustment areas), and outputs a flash firing stop signal ST1 to a flash firing control signal generating circuit 8 at the detected flash firing stop timing.

Figure 4:
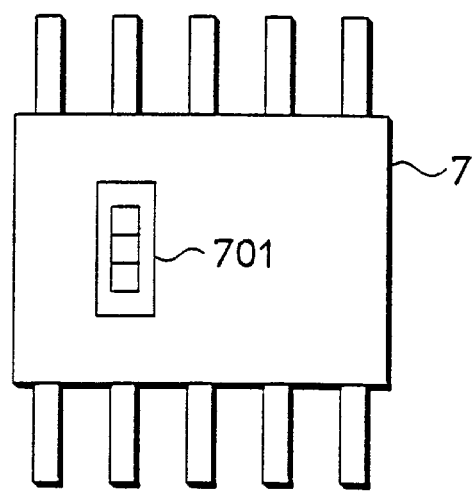
FIG. 4 is a diagram showing a light adjusting circuit.
Figure 7:
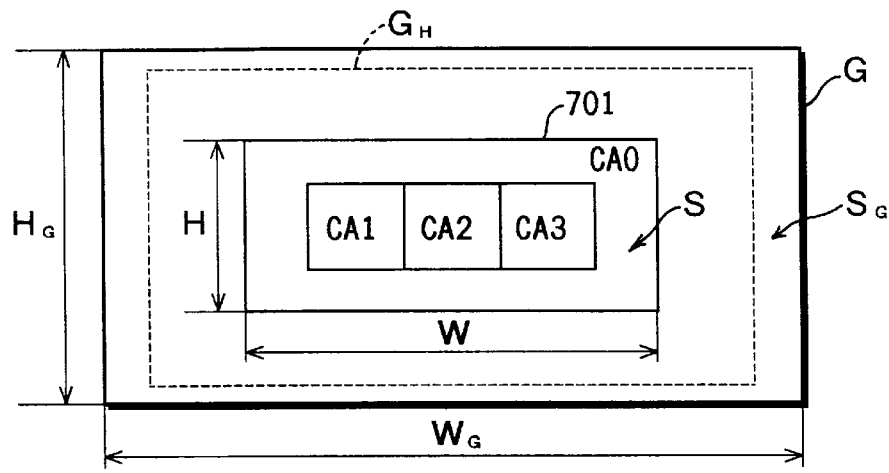
FIG. 7 is a diagram showing a relationship between the respective light adjustment areas of the multi-spot light adjusting circuit and a high vision format area within an exposure region.

The light adjusting circuit 7 includes, as shown in FIG. 4, an IC chip having a light reception window (light adjustment area) 701 divided into four light adjustment areas CA0 to CA3 and is, as shown in FIG. 2, disposed above the AF circuit 4 such that its optic axis extends toward the film surface F. As shown in FIG. 7, the circuit 7 includes three square light adjustment areas CA1 to CA3 arranged in the transverse direction and the light adjustment area CA0 enclosing these areas CA1 to CA3 within the rectangular light adjustment area 701. The light reflected by the film surface F is introduced to the light reception window 701, and the light reflected by the object is separately received in the light adjustment areas CA0 to CA3.

The light adjustment area 701 is divided in order to securely perform a light adjustment for a main object in portrait photographing and to make the light adjustment for the main object relatively easier even in the case that the main object is located on the periphery of the photographic view.

Figure 8:
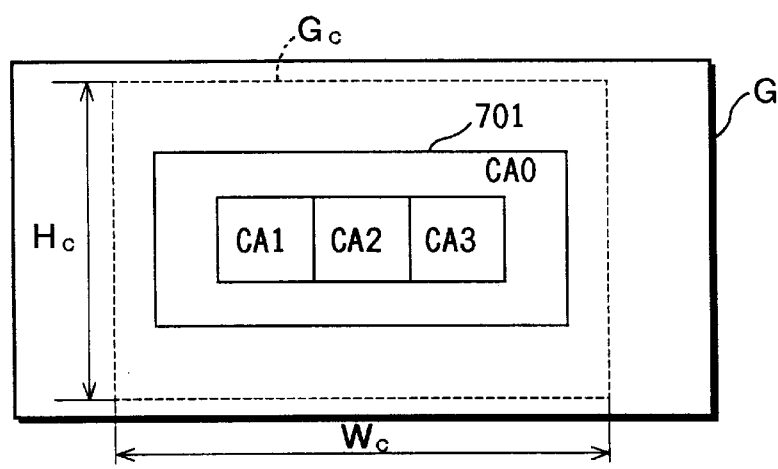
FIG. 8 is a diagram showing a relationship between the respective light adjustment areas of the multi-spot light adjusting circuit and a standard format area within the exposure region.
Figure 9:
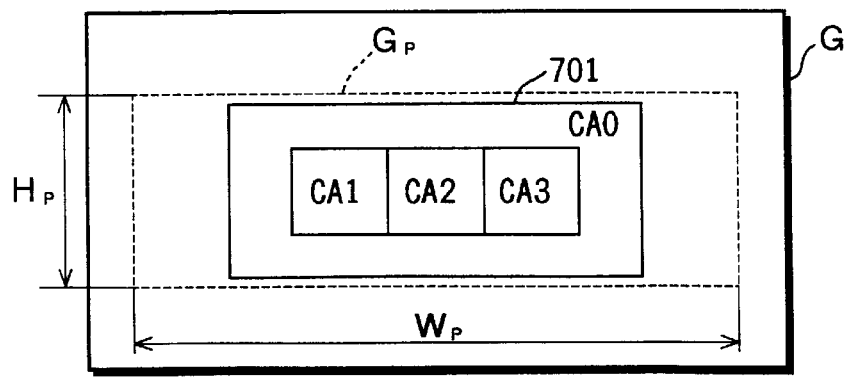
FIG. 9 is a diagram showing a relationship between the respective light adjustment areas of the multi-spot light adjusting circuit and a panorama format area within the exposure region.

In this embodiment, a laterally long exposure region G is set so that prints of high vision aspect ratio, panoramic aspect ratio and standard aspect ratio are obtainable. The size of the laterally long light adjustment area 701 is set, as shown in FIGS. 7 to 9, such that three types of print formats are overlappingly included within the area 701 so as to effectively perform the multi-spot light measurement regardless of in which print format photographing is performed.

More specifically, if $W_G$, $H_G$ are assumed to denote the width and the height of the exposure region G, a ratio $W_G/H_G$ is equal to about an aspect ratio 16/9 of the print area $G_H$ of high vision format (hereinafter, "H-format"). When photographing is performed in standard format (hereinafter, "S-format"), a height $H_S$ of a print area $G_S$ is equal to about the height $H_G$ of the exposure region G, and a width $W_S$ thereof is about ⅘ of the width $W_G$ of the exposure region G (see FIG. 8). When photographing is performed in panorama format (hereinafter, P-format), a width $W_P$ of a print area $G_P$ is equal to about the width $W_G$ of the exposure region G, and a height $H_P$ thereof is about ⅔ of the height $H_G$ of the exposure region G (see FIG. 9). Accordingly, the width of the light adjustment area 701 is approximately less than 80% of the width $W_G$ of the exposure region G, and the height H thereof is approximately less than 60% of the height $H_G$ of the exposure region G. As a result, an area S of the light adjustment area 701 is approximately less than 50% of an area $S_G$ of the exposure region G.

Figure 10:
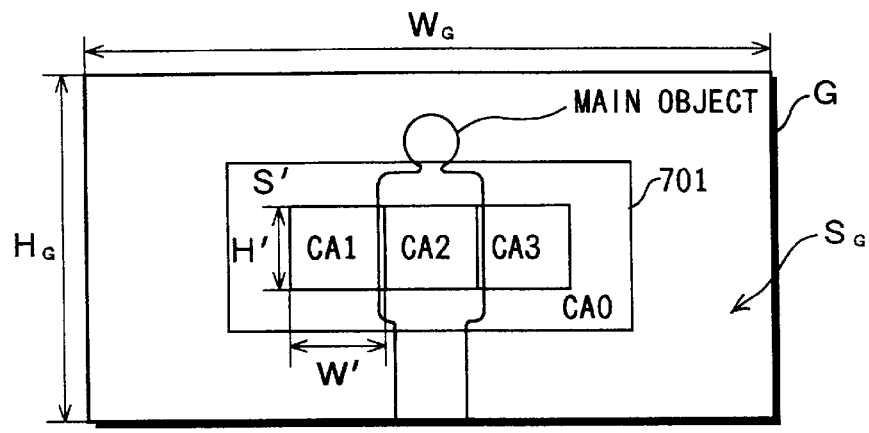
FIG. 10 is a diagram showing a relationship between the size of the light adjustment areas of the multi-spot light adjusting circuit and the size of an object in portrait photographing.
Figure 11:
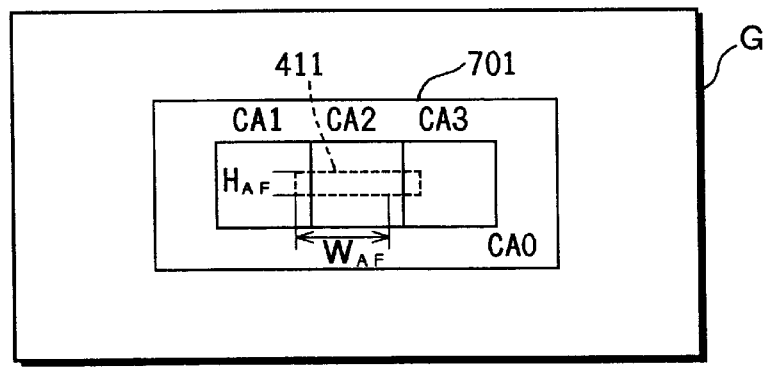
FIG. 11 is a diagram showing a relationship between the light measurement area and the light adjustment areas.

Further, as shown in FIG. 10, the light adjustment areas CA1 to CA3 are set to a predetermined size considerably smaller than the exposure region G so that the light adjustment can be performed only using the light reflected by the main object in portrait photographing. More specifically, in this embodiment, a width W' of each of the light adjustment areas CA1 to CA3 is set at approximately less than 20% of the width $W_G$ of the exposure region G, and a height H' thereof is set at approximately less than 10% of the height $H_G$ of the exposure region G. An area S' of each of the light adjustment areas CA1 to CA3 is substantially less than 10% of the area $S_G$ of the exposure region G.

Although the light adjustment areas CA1 to CA3 are of the same size in this embodiment, at least one light adjustment area may be set at the above size.

The light adjusting circuit 7 is disposed in such a position that the light adjustment area CA2 overlaps a metering area 411 of the AF sensor 41 in the center of the exposure region G. The metering area 411 is such that a height $H_{AF}$ thereof is approximately ⅓ of the height H' of the light adjustment area CA2 and a width $W_{AF}$ thereof is substantially equal to the width W' of the light adjustment area CA2. The dimensions of the metering area 411 is set as above to relax the precision of the positions of the AF sensor 41 and the light adjusting circuit 7. Thus, even if there is a slight displacement, the area CA2 is securely included within the metering area 411 to ensure a secure multi-spot light adjustment control based on the light reflected by the main object.

Although the center light adjustment area CA2 of the light adjustment area 701 overlaps the metering area 411 in this embodiment, the light adjustment area CA1 or CA3 may overlap the metering area 411.

Figure 12:
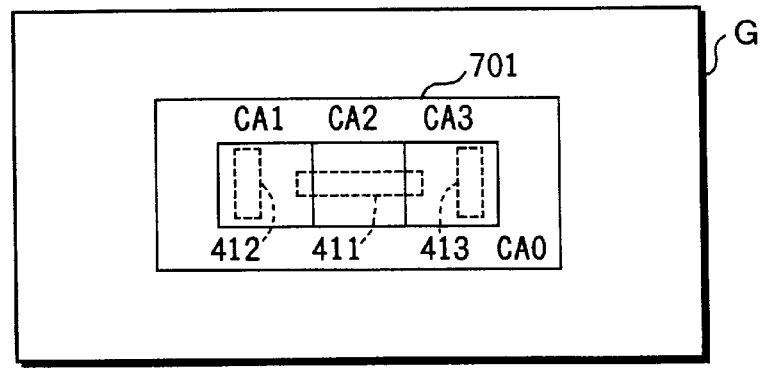
FIG. 12 is a diagram showing a relationship between the light measurement area and the light adjustment areas when a multi-metering method is adopted.

In the case that a multi-metering method is adopted, the light adjustment areas CA1, CA2, CA3 in the center of the photographic view may be so arranged as to overlap their corresponding metering areas 411, 412, 413 as shown in FIG. 12.

Figure 13:
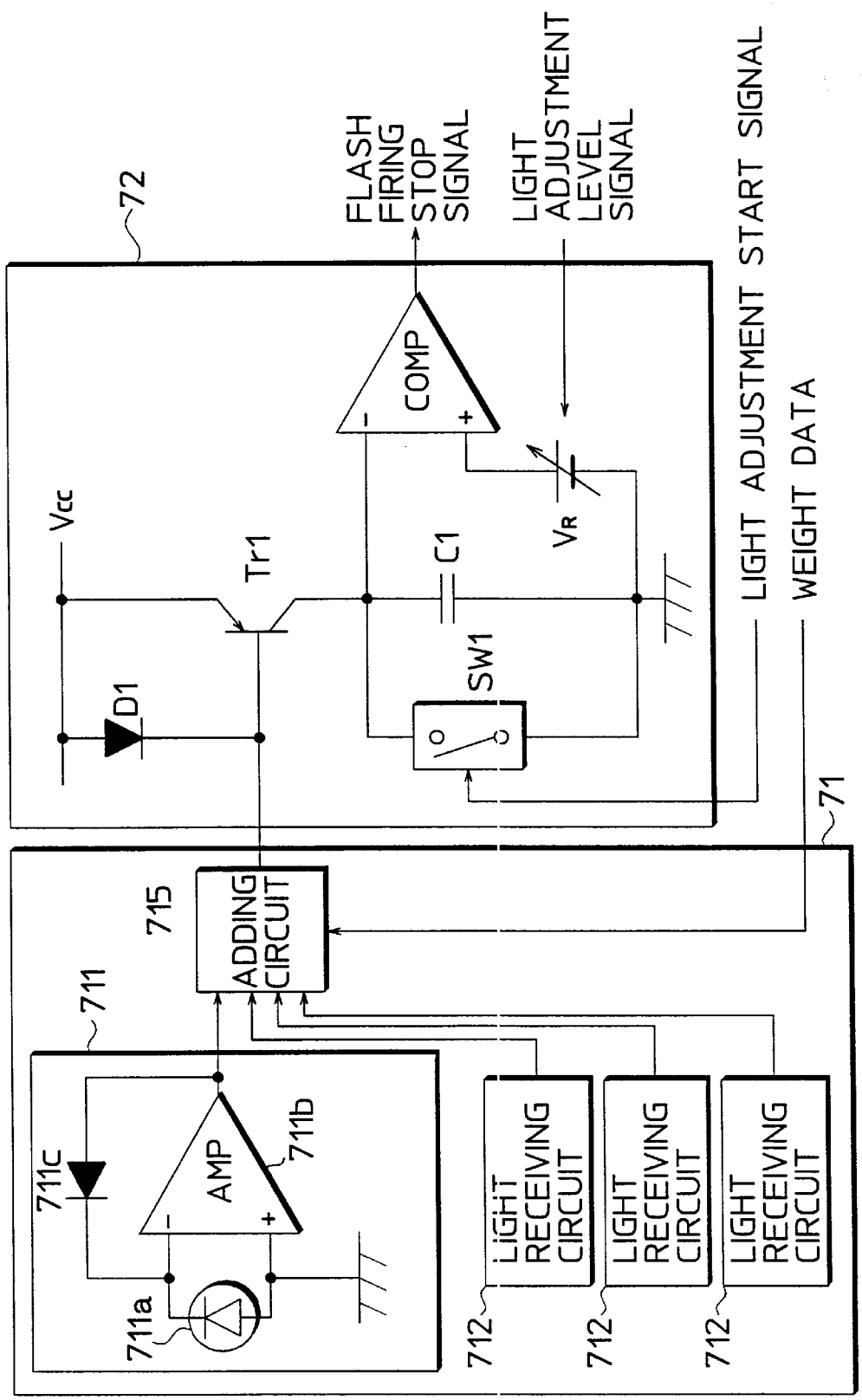
FIG. 13 is a circuit construction diagram of the light adjusting circuit.

FIG. 13 is a circuit construction diagram of the light adjusting circuit 7.

The circuit 7 includes a light receiving unit 71 and a flash firing stop signal generator 72. The light receiving unit 71 includes identically constructed light receiving circuits 711 to 714 for receiving the flash light incident upon the four light adjustment areas CA0 to CA3, and an adding circuit 715 for weighting and adding signals representing the light received by the light receiving circuits 711 to 714 based on the weight data input from the CPU 1.

The light receiving circuit 711 is provided with a photodetector 711a including SPCs (silicon photo cells), an amplifier 711b including an operational amplifier for amplifying a photocurrent detected by the photodetector 711a, and a feedback diode 711c for logarithmically compressing an output current of the amplifier 711a. The photodetector 711a is connected between two input terminals of the amplifier 711b, and the feedback diode 711c is connected between an output terminal and a negative-phase input terminal of the amplifier 711b.

The adding circuit 715 includes four amplifier corresponding to the respective light receiving circuits 711 to 714, and adds output currents of these amplifiers. Gains of the respective amplifiers are set based on the weight data input from the CPU 1, with the result that the output currents of the light receiving circuits 711 to 714 are added after being weighted. More specifically, if I1, I2, I3, I4 denote the output currents of the respective light receiving circuits 711 to 714 and A1, A2, A3, A4 denote the gains of the respective amplifiers, the photocurrent I=(A1·I1+A2·I2+A3·I3+A4·I4) is output from the adding circuit 715.

The signal generator 72 includes a transistor Tr1 for the light adjustment, a diode D1, a capacitor C1, a variable voltage source VR, a switch circuit SW1, and a comparator COMP. The photocurrent detected by the light receiving unit 71 is converted into a voltage $V_C$ by the capacitor C1, and the flash firing stop signal ST1 is output from the comparator COMP when the voltage $V_C$ reaches a reference voltage $V_R$ (light adjustment level) set by the variable voltage source VR.

The transistor Tr1 is a npn-type transistor, and the emitter thereof is connected with a constant voltage source, and the collector thereof is connected with the negative-phase input terminal of the comparator COMP. The diode D1 feeds a bias voltage to the base of the transistor Tr1, and prevents the photocurrent input from the light receiving unit 71 from flowing to the power source. The diode D1 is connected in the forward direction between the constant power source and the base.

The capacitor C1 and the switch circuit SW1 are connected in parallel between the negative-phase input terminal of the comparator COMP and a ground, and the variable voltage source VR is connected between the positive-phase input terminal of the comparator COMP and the ground.

The switch circuit SW1 constitutes a discharging circuit for discharging residual charges of the capacitor C1, and is controllably opened and closed in accordance with a light adjustment start signal (pulse signal) input from the CPU 1. The reference voltage $V_R$ of the variable voltage source VR is set according to the film sensitivity, and a specified reference voltage $V_R$ is set in accordance with a light adjustment level signal from the CPU 1.

Upon the receipt of the light adjustment start signal, the switch circuit SW1 is temporarily closed, with the result that the residual charges of the capacitor C1 are discharged via the switch circuit SW1, thereby starting the light adjustment. In the light receiving circuit 711, the photocurrent photoelectrically converted by the photodetector 711a is output from the amplifier 711b after being logarithmically compressed. Likewise, the photocurrents detected by the light receiving circuits 712 to 714 are output after being logarithmically compressed.

The respective currents output from the light receiving circuits 711 to 714 are added after being weighted corresponding to the respective light adjustment areas in the adding circuit 715, and input to the base of the transistor Tr1 of the signal generator 72.

When the output current from the light receiving unit 71 is input to the base of the transistor Tr1, its collector current flows into the capacitor C1, thereby charging the capacitor C1. When the charging voltage $V_C$ exceeds the reference voltage $V_R$, the output level of the comparator COMP inverts from high level to low level and this inversion signal is output as the flash firing stop signal ST1.

Since the flash firing stop signal ST1 is generated using a weighted added value of all the photocurrents of the light receiving circuits 711 to 714 as described above, when the light adjustment control is performed upon the flash firing stop signal ST1, the flash firing amount of the flash circuit 9 is so controlled as to adjust the weighted average exposure value of the light adjustment areas CA0 to CA3.

The flash firing control signal generating circuit 8 generates a flash firing control signal SFL for designating flash firing start and stop timings of the flash circuit 9 in accordance with the flash firing stop signal ST1 output from the light adjusting circuit 7, the flash firing start signal ST0 output from the CPU 1, and the flash firing stop signal ST2 based on the FM control.

The flash firing start signal ST0 is a rise signal which inverts from low level to high level, and the flash firing stop signals ST1, ST2 are fall signals which invert from high level to low level.

In flash-assisted photography, the CPU 1 calculates a proper flash firing amount of the flash circuit 9 based on an aperture value F set in the taking lens 11 and the object distance D detected by the encoder 5, and also calculates a flash firing period $T_{FM}$ based on the calculated flash firing amount.

Simultaneously with the output of the flash firing start signal ST0 from the CPU 1, the counter 101 starts counting the flash firing period $T_{FM}$. Upon the completion of this counting, the flash firing stop signal ST2 is output.

The signal generating circuit 8 designates the start of the flash firing at the output timing of the flash firing start signal, and outputs a flash firing control signal SFL1 (hereinafter, "earlier control signal SFL1") for designating the stop of the flash firing at the output timing of the earlier one of the flash firing stop signals ST1, ST2.

The signal generating circuit 8 may designate the start of the flash firing at the output timing of the flash firing start signal ST0, and outputs a flash firing control signal SFL2 (hereinafter, "later control signal SFL2") for designating the stop of the flash firing at the output timing of the later one of the flash firing stop signals ST1, ST2.

Figure 14:
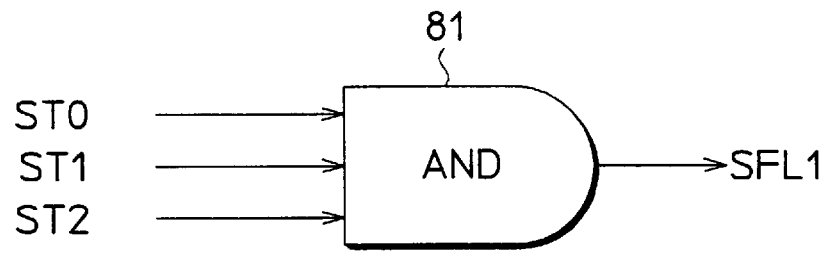
FIG. 14 is a diagram showing an exemplary circuit for generating a flash firing control signal SFL1 for instructing a stop of flash firing at an output timing of an earlier one of flash firing stop signals ST1, ST2.

FIG. 14 is a circuit diagram of the signal generating circuit 8 for generating the earlier control signal SFL1.

In the shown circuit, the signal generating circuit 8 is constituted by an AND circuit. The AND circuit 81 outputs a logical sum signal of the flash firing start signal ST0 and the flash firing stop signals ST1, ST2.

Figure 15:
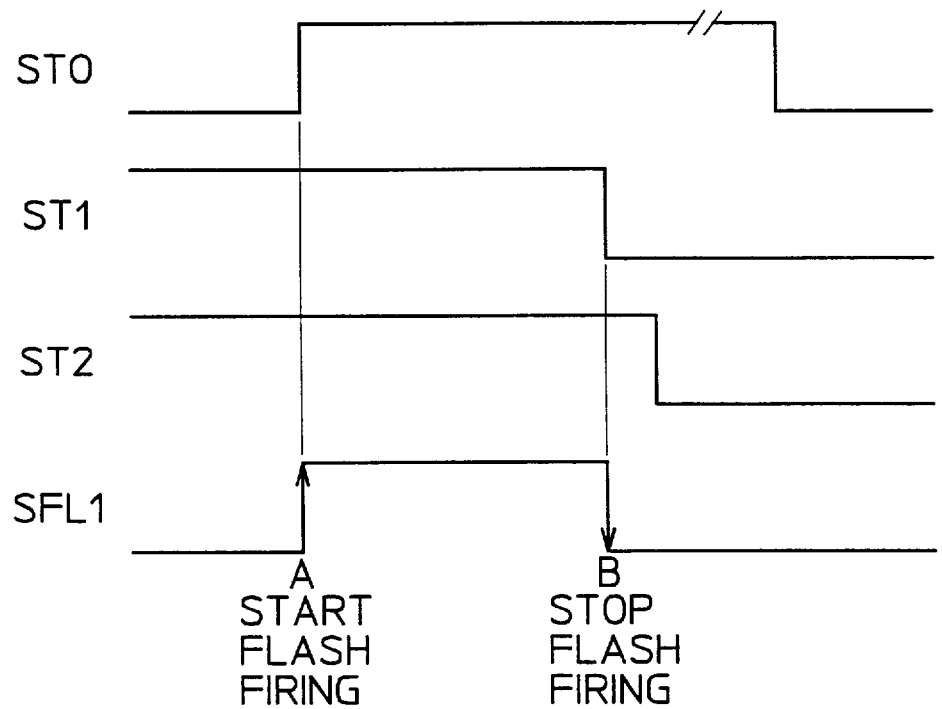
FIG. 15 is a timing chart showing the operation of the circuit of FIG. 14.

FIG. 15 is a timing chart when the flash firing stop signal ST1 is output earlier than the flash firing stop signal ST2. The output signal SFL1 of the AND signal 81 is a signal which rises at the rise timing of the flash firing start signal ST0 (turn-on), and falls at the fall timing of the flash firing stop signal ST1 (turn-off).

If the flash firing stop signal ST2 is output earlier than the flash firing stop signal ST1, the output signal SFL1 of the AND circuit 81 rises when the flash firing stop signal ST2 rises.

Figure 16:
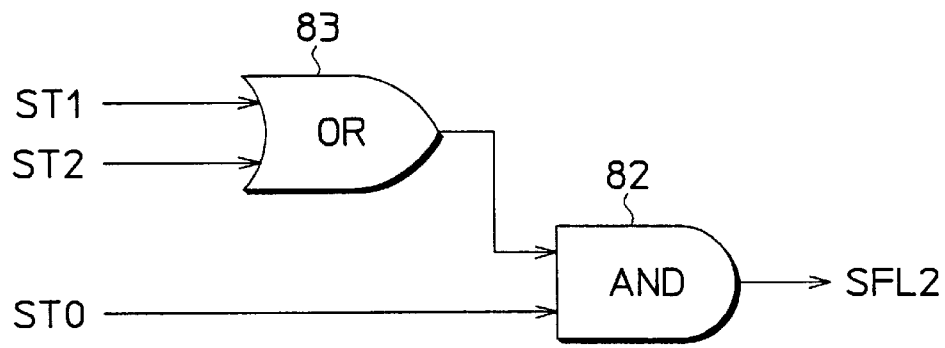
FIG. 16 is a diagram showing an exemplary circuit for generating a flash firing control signal SFL2 for instructing a stop of flash firing at an output timing of a later one of the flash firing stop signals ST1, ST2.

FIG. 16 is a circuit diagram of the signal generating circuit 8 for generating the later control signal SFL2.

In the shown circuit, an OR circuit 83 which takes a logical product of the flash firing stop signals ST1 and ST2, and an AND circuit 82 takes a logical sum of the logical product signal from the OR circuit 83 and the flash firing start signal ST0 and outputs this logical sum signal as the flash firing control signal SFL 2.

The logical product signal output from the OR circuit 83 is a signal which inverts from high level to low level at the output timing of the later one of the flash firing stop signals ST1 and ST2, i.e., detects which of the flash firing stop signals ST1, ST2 is output later. Accordingly, the logical sum signal (flash firing control signal SFL2) of the logical product signal output from the AND circuit 82 and the flash firing start signal ST0 rises (turn-on) when the flash firing start signal ST0 rises and falls (turn-off) when the later flash firing stop signal ST2 rises as shown in FIG. 17.

Figure 17:
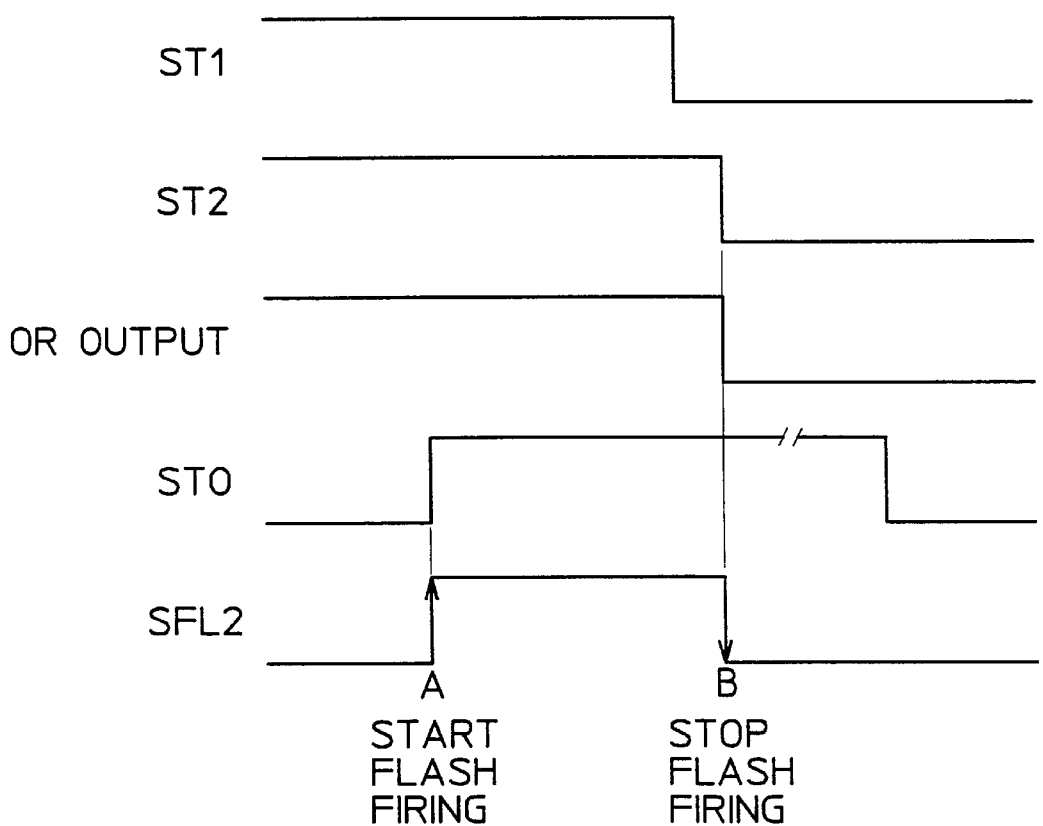
FIG. 17 is a timing chart showing the operation of the circuit of FIG. 16.

FIG. 17 is a timing chart showing the case where the flash firing stop signal ST1 is output earlier than the flash firing stop signal ST2. When the flash firing stop signal ST2 is output earlier than the flash firing stop signal ST1, the output signal SFL2 of the AND circuit 82 falls (turn-off) when the flash firing stop signal ST1 falls.

Figure 18:
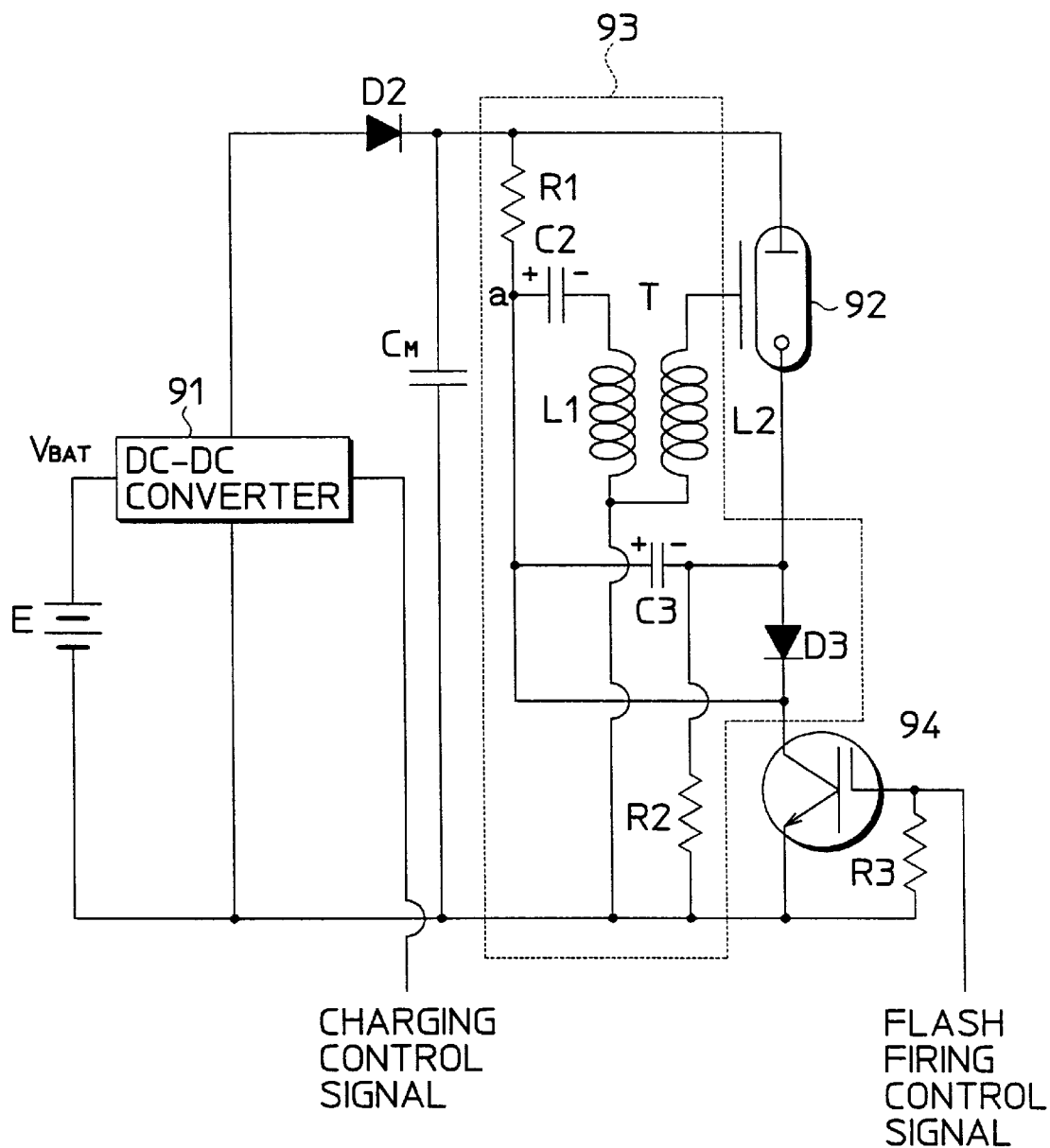
FIG. 18 is a circuit construction diagram of a flash circuit.

The flash circuit 9 generates a flash light and is constructed, for example, as shown in FIG. 18.

The flash circuit 9 includes a battery E, a dc-dc converter 91 for converting a battery voltage $V_{BAT}$ into a specified dc high voltage, a diode D2 for rectifying an output of the converter 91, a main capacitor $C_M$ for storing energy to be discharged from the flash device, a xenon tube 92 for generating a flash light by discharging the charges stored in the main capacitor $C_M$, a trigger circuit 93 for applying a trigger voltage to the xenon tube 92, and a switch device 94 including an IGBT for controlling the light emission of the xenon tube 92 by the flash firing control signal SFL1 (or SFL2).

The battery E is connected in parallel with the input terminal of the converter 91, and the main capacitor $C_M$ is connected in parallel with the output terminal of the converter 91 via the diode D2. A series circuit formed by the xenon tube 92, the diode D3 and the IGBT 94 is connected in parallel with the main capacitor $C_M$.

The trigger circuit 93 is mainly constituted by a booster transducer T. One end of a primary coil L1 of the transducer T is connected with a positive electrode of the main capacitor $C_M$ via a series circuit formed by a resistor R1 and a capacitor C2, and one end of a secondary coil L2 thereof is connected with a trigger terminal of the xenon tube 92. The other ends of the primary and secondary coils L1, L2 are both connected with a negative electrode (earth line) of the main capacitor $C_M$. A point of connection a of the resistor R1 and the capacitor C2 is connected with a cathode of the diode D3 and also with an anode of the diode D3 via a capacitor C3. A resistor R2 is provided between the anode of the diode D3 and the earth line.

The converter 91 is controllably driven in accordance with a charging control signal SC input from the CPU 1. The charging of the main capacitor $C_M$ is controlled by this drive control.

In the above construction, upon being activated by the charging control signal SC, the converter 91 outputs a voltage obtained by boosting the battery voltage $V_{BAT}$ by several 100s of V (e.g., 300 to 400 V). The main capacitor $C_M$ is charged by this boosted voltage. Simultaneously, the capacitors C2 and C3 are charged to the shown polarities via the resistor R1 and via the resistors R1, R2, respectively.

Upon the input of the flash firing control signal SFL to the IGBT 94 after the charging of the main capacitor $C_M$ is completed, the IGBT 94 is turned on upon the rise of the flash firing control signal SFL (timing A in FIGS. 15 and 17). This is equivalent to parallel connection of the series circuit formed by the xenon tube 92 and the diode D3 with the main capacitor $C_M$. As a result, a discharge path for the charges stored in the main capacitor $C_M$ is formed.

Simultaneously, the positive sides of the capacitors C2, C3 are connected with the earth line (grounded) via the IGBT 94, and a high voltage of several kV induced in the secondary coil of the transducer T by the flow of the charges stored in the capacitor C2 via the IGBT 94 is applied to the xenon tube 92 as a trigger voltage. On the other hand, a voltage which is a sum of the voltage from the main capacitor $C_M$ and the voltage from the capacitor C3, i.e., a voltage of approximately twice the voltage from the main capacitor $C_M$ is applied to the xenon tube 92. As a result, the charges stored in the main capacitor $C_M$ are discharged to the series circuit formed by the xenon tube 92, the diode D3 and the IGBT 94, thereby emitting a flash light.

Thereafter, when the flash firing control signal SFL inverts from high level to low level (see timing B in FIGS. 15 and 17), the IGBT 94 is turned off, thereby shutting off the discharge path of the xenon tube 92 to stop the flash firing. Accordingly, the flash firing amount of the flash circuit 9 is controlled by controlling the period during which the IGBT 94 is kept on.

With the above construction, in flash-assisted photography, the CPU 1 sets a light adjustment period $T_{FM}$ by the FM control based on the aperture value F, the object distance D and the detection precision of the object distance D, and sets weighted average values for the respective light adjustment areas CA0 to CA3 of the light adjusting circuit 7 based on the precision of the AF control by the taking lens 11 and the variation of the brightness of the main object before photographing.

Further, the CPU 1 outputs the charging control signal SC to the flash circuit 9, thereby starting the charging of the flash circuit 9. Upon the completion of the charging, the CPU 1 outputs the flash firing start signal ST0 to the flash firing control signal generating circuit 8 at a specified timing, and the light adjustment level signal and light adjustment start signal are output to the light adjusting circuit 7 at specified timings. The CPU 1 also counts the light adjustment period $T_{FM}$ by the FM control.

The flash firing start signal ST0 is input as it is to the flash circuit 9 via the signal generating circuit 8, and the flash device is fired at this input timing.

Thereafter, the CPU 1 outputs the flash firing stop signal ST2 to the signal generating circuit 8 at the timing when the light adjustment period $T_{FM}$ is counted up. When an amount of flash light reflected by the object and received by the light adjusting circuit 7 reaches a specified light adjustment level, the light adjusting circuit 7 outputs the flash firing stop signal ST1 to the signal generating circuit 8.

The signal generating circuit 8 generates the flash firing stop signal at the output timing of the earlier one of the flash firing stop signals ST1 and ST2, and outputs the same to the flash circuit 9 to stop the flash firing.

In other words, the flash firing control by the FM control and that by the light adjustment control are simultaneously started upon the firing of the flash device, and the flash firing amount is controlled by either one of the FM control and the light adjustment control according to the camera control conditions or object conditions.

Next, the flash firing control of the flash-assisted photographing system according to the embodiment is specifically described.

Figure 19:
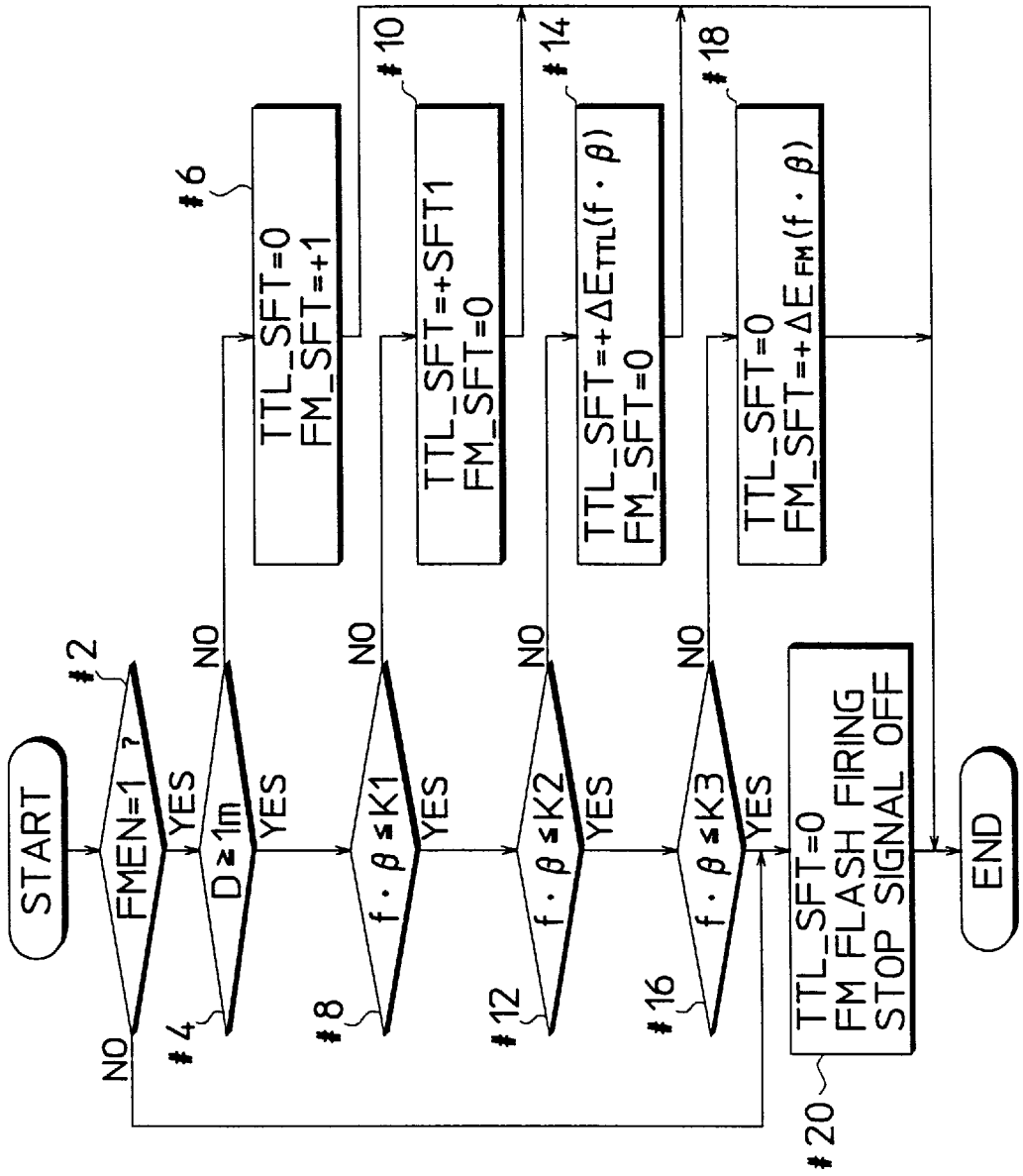
FIG. 19 is a flowchart for setting an exposure correction value in the respective flash firing controls, an FM control and a light adjustment control.

FIG. 19 is a flowchart showing a setting of an exposure correction value in the respective flash firing controls, i.e., the FM control and the light adjustment control.

In the FM control, the accuracy of the calculated flash firing control value is reduced due to an error in the detection precision of the object distance D, i.e., a control error in driving the taking lens 11, with result that the exposure deviates from a proper value.

In the light adjustment control, as shown in TABLE-1 below, the amount of the reflected flash light varies according to the variation of the reflectance of the object within the photographic view, with the result that the exposure deviates from a proper value. More specifically, in the case that the object has, as a whole, a dark color such as black or navy blue, the intensity of the flash light reflected by the object is small and, therefore, it takes a long time until the amount of received flash light reaches the predetermined light adjustment level. Thus, the flash firing amount exceeds the proper level, and the photographed picture is over-exposed.

On the other hand, in the case that the object has, as a whole, a bright color such as white or yellow, the intensity of the flash light reflected by the object is large and, therefore, the amount of received flash light reaches the predetermined light adjustment level with a short period of time. Thus, the flash firing amount is below the proper level, and the photographed picture is under-exposed.

TABLE 1

| COLOR TONE OF THE OBJECT | INTENSITY OF THE REFLECTED LIGHT | LIGHT ADJUSTMENT AMOUNT | EXPOSURE RESULT |
| --- | --- | --- | --- |
| DARK COLORS | SMALL | EXCESS | OVER-EXPOSURE |
| NEUTRAL TONES | MEDIUM | PROPER | PROPER |
| BRIGHT COLORS | LARGE | SHORTAGE | UNDER-EXPOSURE |

The flowchart of FIG. 19 is executed to set the exposure correction value in the respective flash firing controls: the FM control and the light adjustment control according to the accuracy of the drive control of the taking lens 11 and the object distance D. This flowchart is executed before the exposure, e.g., during the photographing preparatory operation performed when a release switch is pressed halfway.

Upon entering this flowchart, it is discriminated whether a flag FMEN is set at "1" (Step #2).

This flag FMEN indicates whether the FM control can be performed. For example, if the FM control and the light adjustment control can be selected by operating the switch, the flag FMEN is reset to "0" when the light adjustment control is set by this switch. In flash devices having a flash bouncing function, a wireless flash function, a wired synchronization function or the like, the flag FMEN is also reset to "0" when such a function is selected or a diffusion plate which distracts a proper FM control is mounted.

If the flag FMEN is set at "0" (NO in Step #2), it is meaningless to perform the FM control. Accordingly, Step #20 follows in which a correction value for the light adjustment value TTL_SFT is set to "0" (i.e., the correction is not to be made) and the output of the flash firing stop signal ST2 used for the FM control is prohibited, and this routine returns.

The correction value TTL_SFT for the light adjustment control and a correction value FM_SFT for the FM control to be described later are values used to correct a control flash firing amount. This value is set by a correction amount (apex value, unit [EV]) in the exposure value of the photographed picture.

If the flag FMEN is set at "1" (YES in Step #2), since the FM control is possible, it is further discriminated whether the object distance D is 1 m or longer (Step #4). If D<1 m (close-up photography), the correction value TTL_SFT for the light adjustment control is set to "0", and the correction value FM_SFT is set to "+1" (Step #6), and this routine returns. If D≧1 m, Step #8 follows.

The above discrimination is made based on the object distance D because the diffusion plate is highly likely to be mounted in close-up photography. The diffusion plate is assumed to be mounted in the case that the object distance is shorter than the specified distance in Steps #4, #6 so as to compensate for a reduction in the received flash light caused by the use of the diffusion plate.

Although the discrimination criterion for the close-up photography by the object distance is set at "1 m" in this embodiment, it is not limited to this, but may be set to any suitable reference value. Further, the correction value FM_SFT for the FM control is not limited to "+1", either, but may be set to any suitable correction value which is obtained empirically or experimentally.

In Step #8 and subsequent steps, the calculation accuracy of the object distance D having a large influence on the FM control is discriminated based on a product f·β of the focal length f and a magnification β. The correction values FM_SFT, TTL_SFT for the FM control and the light adjustment control are set according to the above discrimination results (Steps #8 to #20), and this routine return.

The magnification β is calculated by the CPU 1 based on the object distance D detected by the encoder 5 and the focal length f detected by the encoder 6: β=k·f/D (where k denotes a proportional coefficient). The product f·β corresponds to the projected amount of the taking lens 11 in its specified reference position (for example, ∞ position) and, thus, the larger the product f·β, the larger the projected amount of the taking lens 11.

As the projected amount of the taking lens 11, i.e., a lens drive amount from the reference position becomes larger, the influence of the error in the lens drive amount becomes relatively smaller. Accordingly, the accuracy of the drive control of the taking lens 11 can be assumed based on the product f·β.

In this embodiment, the accuracy of the drive control of the taking lens 11 is discriminated based on f·β, and the correction values FM_SFT, TTL_SFT for the FM control and the light adjustment control are set based on this discrimination result.

More specifically, in Steps #8, #12, #16, there are defined four areas ① f·β>K1, ② K1≧f·β>K2, ③ K2≧f·β>K3, ④ K3≧f·β, and the correction values FM_SFT, TTL_SFT for the FM control and the light adjustment control are set as follows according to the area of the f·β. It should be appreciated that K1 to K3 are specified threshold values which are set according to the characteristic of a mechanism for driving the taking lens of each camera.

① f·β>K1 (NO in Step #8)
  (1) TTL_SFT="+SFT1=+$\Delta E_{TTL}$(K1)"
  (2) FM_SFT="0" (Step #10)
② K1≧f·β>K2 (NO in Step #12)
  (1) TTL_SFT="+$\Delta E_{TTL}$(f·β)"
  (2) FM_SFT="0" (Step #14)
③ K2≧f·β>K3 (NO in Step #16)
  (1) TTL_SFT="0"
  (2) FM_SFT="+$\Delta E_{FM}$(f·β)" (Step #18)
④ K3≧f·β (YES in Step #16)
  (1) TTL_SFT="0"
  (2) flash firing stop signal ST2 prohibited (Step #20)

Figure 20:
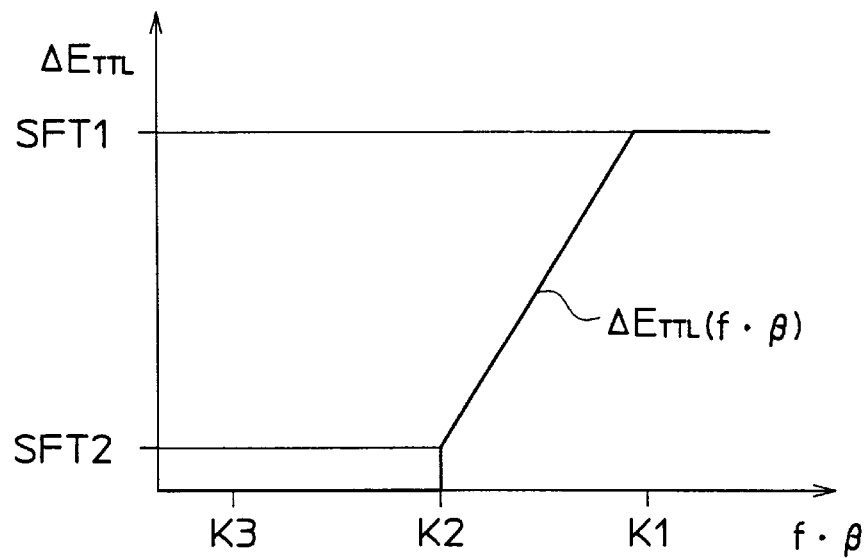
FIG. 20 is a graph showing a program line for setting the exposure correction value in the light adjustment control.
Figure 21:
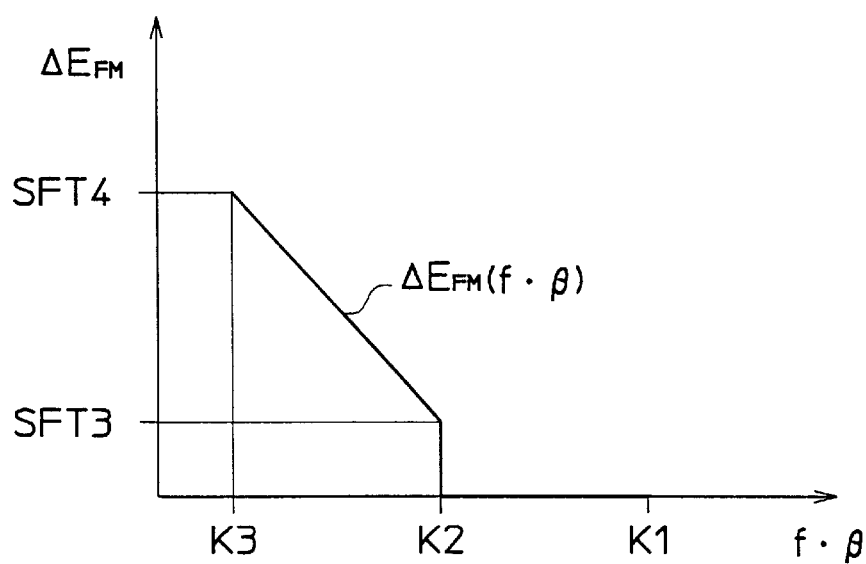
FIG. 21 is a graph showing a program line for setting the exposure correction value in the FM control.

It should be appreciated that $\Delta E_{TTL}$(f·β) is a correction value for the light adjustment control set according to the value of f·β in accordance with a preset program line as shown in FIG. 20, and $\Delta E_{FM}$(f·β) is a correction value for the FM control set according to the value of f·β in accordance with a preset program line as shown in FIG. 21.

The area ① is where the projected amount of the taking lens is large and the influence of the error of the lens drive control on the FM control is considerably small, i.e., where the accuracy of the FM control is considerably high. In this area, since the FM control is hardly influenced by the control error, no correction is made therefor.

However, if flash-assisted photography by the FM control is performed using the diffusion plate mounted as in macrophotography, a close object may be erroneously determined to be a distant object, with the result that the final picture may be over-exposed. Thus, in this area, the flash firing control is performed by the light adjustment control as much as possible, and the correction value TTL_SFT thereof is set to +SFT1 (maximum correction value) to suppress the likelihood of over-exposure.

The area ② is where the accuracy of the FM control is relatively satisfactory. In this area as well, no correction is made for the FM control since the influence of the control error is small. However, the correction value TTL_SFT for the light adjustment control is corrected by +$\Delta E_{TTL}$(f·β) corresponding to f·β, so that the suppression effect of the over-exposure is smoothed according to f·β (i.e., according to the projected amount of the taking lens 11).

The area ③ is where the accuracy of the FM control is unsatisfactory. In this area, no correction is made for the light adjustment control, but the correction value FM_SFT for the FM control is corrected by +$\Delta E_{FM}$(f·β) corresponding to f·β, so that the flash firing amount by the FM control caused by the unsatisfactory accuracy is smoothly corrected according to f·β (i.e., according to the projected amount of the taking lens 11).

Since the correction value TTL_SFT for the light adjustment control is set at "0", when the object is black, the exposure tends to be excessive if the light adjustment control is performed. However, if the FM control is performed, since the correction value FM_SFT for the FM control is set at +$\Delta E_{FM}$(f·β), the over-exposure can be suppressed while the exposure deviation caused by the control error of the lens drive is corrected as much as possible.

The area ④ is where the accuracy of the FM control is very bad. In this area, since flash-assisted photography by the FM control is improper, the FM control is prohibited and the flash firing amount is controlled only by the light adjustment control.

Next, how the weights are set when the weighted average values of the light amounts received in the respective light adjustment areas CA0 to CA3 during the light adjustment control are calculated is described.

Figure 22:
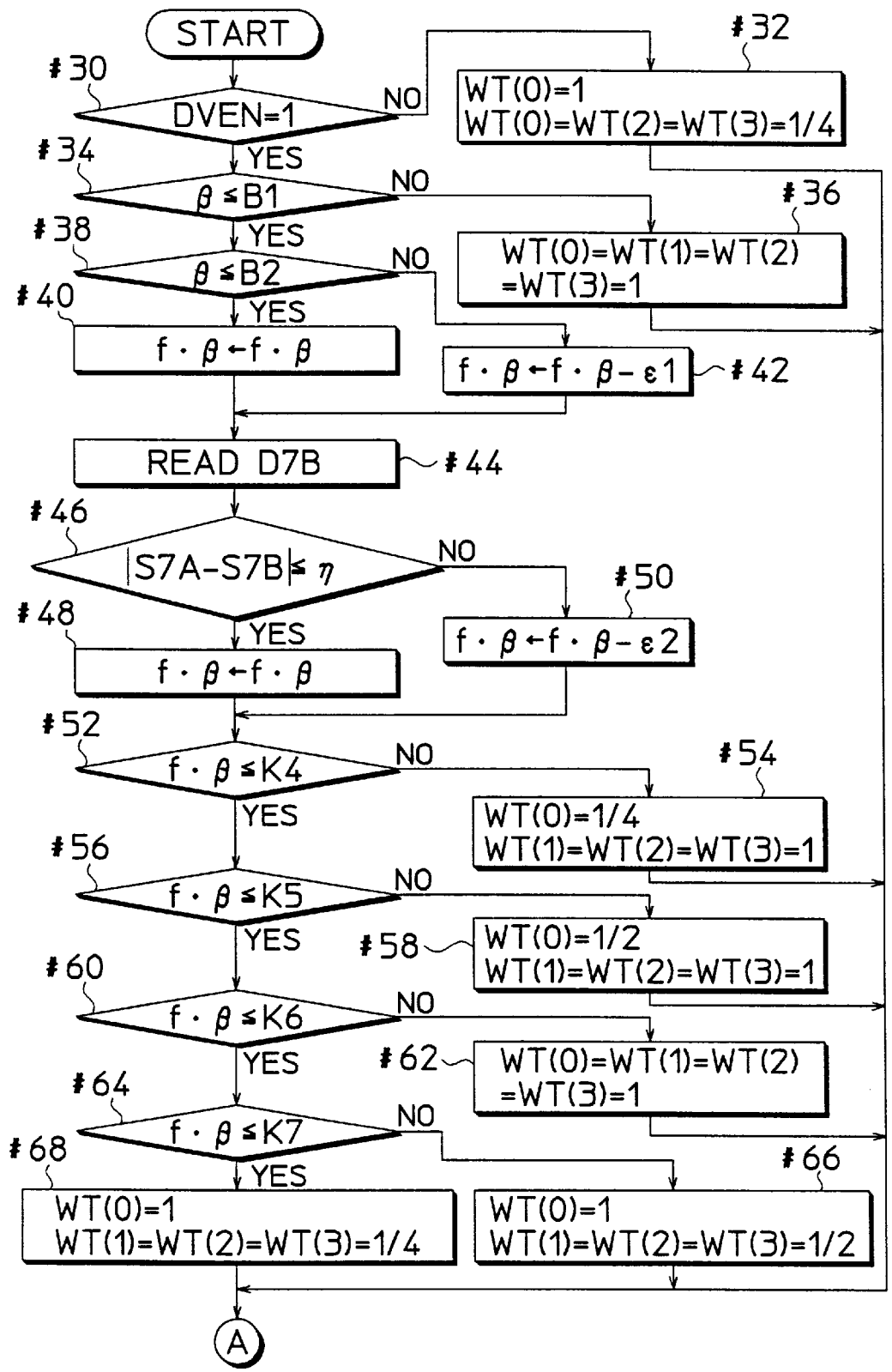
FIGS. 22 and 23 are a flowchart for setting weights for the respective light adjustment areas CA0 to CA3 in the light adjustment control.
Figure 23:
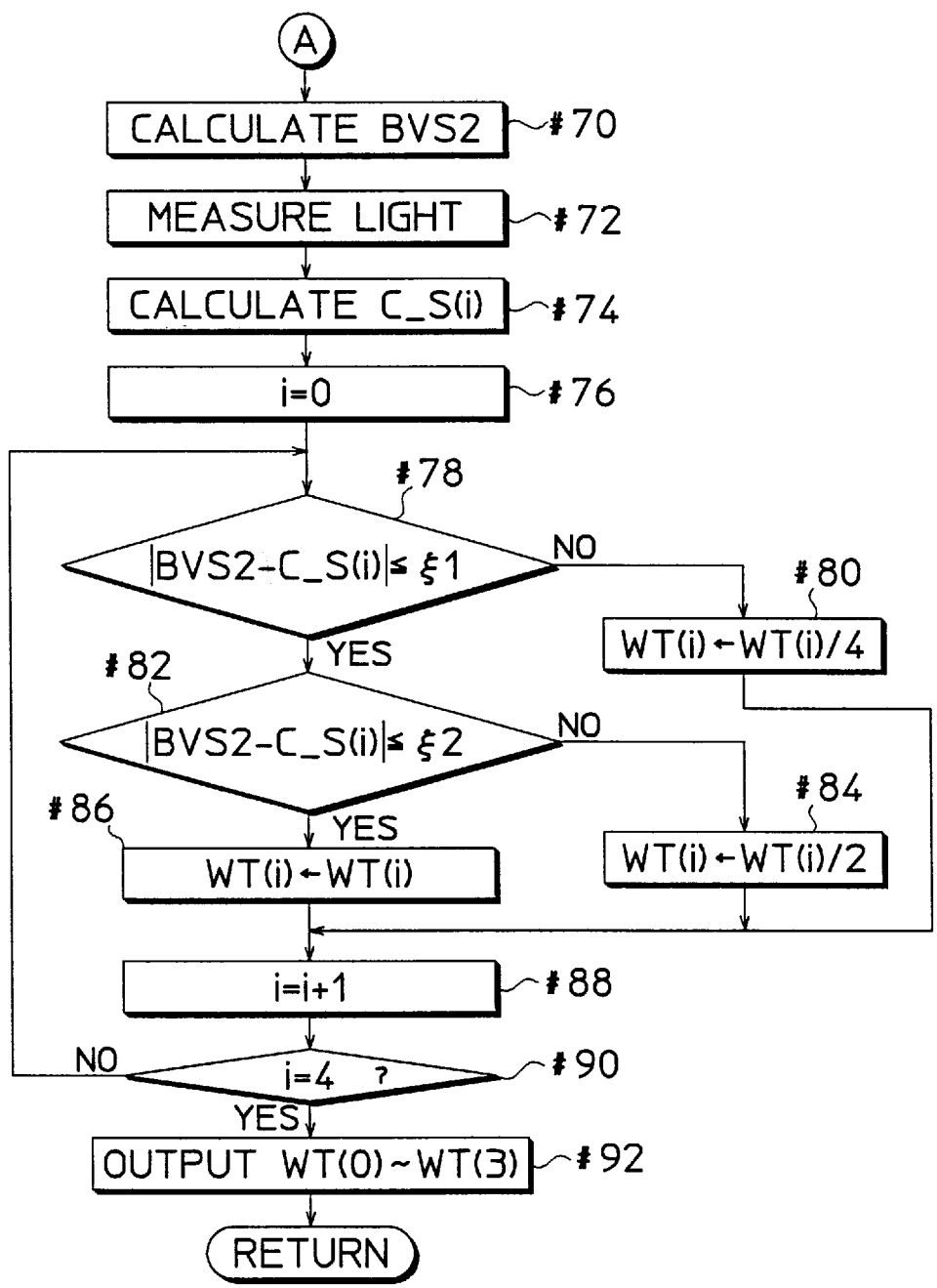

FIGS. 22 and 23 are a flowchart showing a setting of weights for the light adjustment areas CA0 to CA3 in the multi-spot light adjustment control.

Similar to the flowchart of FIG. 19, this flowchart is also implemented during the photographing preparatory operation before the exposure is made.

Upon entering this flowchart, it is discriminated whether a flag DVEN is set at "1" (Step #30). The flag DVEN indicates whether the taking lens capable of detecting the object distance D is mounted. If the object distance D is detectable, the flag DVEN is set at "1". When the taking lens is mounted on a camera main body, the type of the taking lens is discriminated and the flag DVEN is set based on this discrimination result.

Unless the flag DVEN is set at "1" (NO in Step #30), Step #70 follows after weights WT(0), WT(1), WT(2), WT(3) corresponding to the light adjustment areas CA0, CA1, CA2, CA3 are set such that WT(0)=1, WT(1)=WT(2)=WT(3)=¼, respectively (Step #32).

If the weights are set such that WT(0)=1, WT(1)=WT(2) =WT(3)=¼, the light adjustment is performed while substantially equally averaging the entire image to be photographed.

If the flag DVEN is set at "1" (YES in Step #30), it is further discriminated whether the magnification β exceeds a predetermined magnification B1 (whether macro-photography is to be performed) (Step #34). If β>B1 (macro-photography) (NO in Step #34), Step #70 follows after setting WT(0), WT(1), WT(2), WT(3) to "1" (Step #36).

In macro-photography, the main object is normally located in the center of the photographic view. Accordingly, the weights for the light adjustment areas CA1 to CA3 located in the center of the photographic view is made larger with respect to that of the peripheral light adjustment area CA0, thereby performing the light adjustment focusing the center of the photographic view.

The discrimination as to whether macro-photography is to be performed may be made based on the focal length f detected during the AF control. However, according to this control, the focal point largely deviates when a camera holder make a slight movement along forward or backward direction during macro-photography, thereby reducing the reliability of the discrimination result. Thus, the above discrimination is made based on the magnification in this embodiment.

If β≦B1 (YES in Step #34), it is discriminated whether the magnification β is B2 (<B1) or smaller (whether normal photographing is to be performed) (Step #38). If B2≧β (medium level macro-photography) (YES in Step #38), Step #44 follows without correcting the value of f·β (Step #40). If B1≧β≧B2 (normal photographing) (NO in Step #38), Step #44 follows after the value of f·β is corrected to (f·β−ϵ1) (Step #40).

It should be noted that ϵ1 is a specified correction value set in advance. The reason why f·β is corrected in normal photographing is that there is a possibility that the main object is located outside the center of the photographic view in this case. Therefore, the weights WT(0) to WT(3) can be set in Steps to be described later so as to perform the light adjustment reflecting the image in the peripheral portion of the photographic view more than in macro-photography.

In Step #44, a light measurement data D7B of the light measurement area S7 (see FIG. 5) in the center of the photographic view is read. Subsequently, a difference ΔD=|D7A−D7B| between the light measurement data D7B and the light measurement data D7A of the light measurement area S7 detected during the AF control is discriminated to be not larger than η (Step #46). This discrimination is made to assume based on the variation of the brightness in the center of the photographic view whether the main objet has moved immediately before the exposure after the AF control.

If |D7A−D7B|≦η i.e., the main object is assumed not to have moved (YES in Step #46), Step #52 follows without correcting the value of f·β (Step #48). If |D7A−D7B|>η, i.e., the main object is assumed to have moved (NO in Step #46), Step #52 follows after correcting the value of f·β to (f·β−ϵ2) (Step #50).

It should be noted that ϵ2 is a specified correction value set in advance. The reason why f·β is corrected when the main object is assumed to have moved is that there is a possibility that the main object is located outside the center of the photographic view in this case similar to the case of Step #40. Therefore, the weights WT(0) to WT(3) can be set in Steps to be described later so as to perform the light adjustment reflecting the image in the peripheral portion of the photographic view more than in macro-photography.

Subsequently, in Steps #52 to #68, the accuracy of the lens drive in the AF control is assumed based on the value of f·β, and the weights WT(0) to WT(3) for the respective light adjustment areas CA0 to CA3 are set based on this assumption result. More specifically, the range of f·β is divided into five areas: (A) f·β>K4, (B) K4≧f·β>K5, (C) K5≧f·β>K6, (D) K6≧f·β>K7 and (E) K7≧f·β, and the weights WT(0) to WT(3) are set as follows according to the area of f·β.

(A) f·β>K4 (NO in Step #52)
　WT(0)=¼
　WT(1)=WT(2)=WT(3)=1 (Step #54)
(B) K4≧f·β>K5 (NO in Step #56)
　WT(0)=½
　WT(1)=WT(2)=WT(3)=1 (Step #58)
(C) K5≧f·β>K6 (NO in Step #60)
　WT(0)=WT(1)=WT(2)=WT(3)=1 (Step #62)
(D) K6≧f·β>K7 (NO in Step #64)
　WT(0)=1
　WT(1)=WT(2)=WT(3)=½ (Step #66)
(E) K7≧f·β (YES in Step #64)
　WT(0)=1
　WT(1)=WT(2)=WT(3)=¼ (Step #68)

Since the control accuracy of the lens drive is higher as the value of f·β becomes larger as described above, the control accuracy reduces in the order of (A) to (E).

The area (A) is where the control accuracy is highest. A spot light adjustment is performed by the central light measurement areas CA1 to CA3 by setting the weight for the peripheral light measurement area CA0 to ¼ of that of the light adjustment areas CA1 to CA3.

The area (C) is where the control accuracy is at standard level. By equally setting the weights for the light adjustment areas CA0 to CA3, the light adjustment can be performed more focusing on the central light adjustment areas CA1 to CA3 than the peripheral light adjustment area CA0.

The area (E) is where the control accuracy is lowest. By setting the weights for the light adjustment areas CA1 to CA3 to ¼ of that of the peripheral light adjustment area CA0, the light adjustment can be performed while substantially equally averaging the entire photographic view.

The area (B) is where the control accuracy is between those of the areas (A) and (C). By setting the weights for the peripheral light adjustment area CA0 to ½ of those of the central light adjustment areas CA1 to CA3, a difference between the exposure by the light adjustment control in the case of the area (A) and that in the case of the area (C) is intended to be reduced.

The area (D) is where the control accuracy is between those of the areas (C) and (E). By setting the weights for the central light adjustment area CA1 to CA3 to ½ of that of the peripheral light adjustment area CA0, a difference between the exposure by the light adjustment control in the case of the area (C) and that in the case of the area (E) is intended to be reduced.

Upon completion of the setting of the weights WT(0) to WT(3) of the respective light adjustment areas CA0 to CA3 based on the control accuracy of the lens drive, an object brightness BVS2 is calculated based on the light measurement data obtained in the light measuring circuit 3 during the AF control (Step #70). The object brightness BVS2 is calculated by processing 14 light measurement data obtained for the respective light measurement areas S0 to S13 in a specified manner.

Subsequently, the light measurement is performed again by the light measuring circuit 3 (Step #72), and brightness C_S(i) (i=0, 1, 2, 3) in a position corresponding to each of the light adjustment areas CA0 to CA3 of the light adjusting circuit 7 is calculated based on the obtained light measurement data (Step #74). Each brightness C_S(i) is calculated by applying a specified processing to 14 light measurement data obtained for the respective light measurement areas S0 to S13.

Subsequently, in Steps #76 to #90, the movement of the object in each of the respective light adjustment areas CA0 to CA3 is assumed based on the difference between the object brightness BVS2 obtained during the AF control and the brightness C_S(i) corresponding to each of the respective light adjustment areas CA0 to CA3, and the weights WT(0) to WT(3) corresponding to the light adjustment areas CA0 to CA3 are adjusted based on the assumption results.

More specifically, a counter i for counting the number of the light adjustment areas is set to "0" (Step #76), and it is discriminated in which of cases(a) to (c) a brightness difference $|BVS2-C\_S(0)|$ between the brightness C_S(0) corresponding to the light adjustment area CA0 and the object brightness BVS2 falls within: (a) $\epsilon1<|BVS2-C\_S(0)|$, (b) $\epsilon2<|BVS2-C\_S(0)|\leq\epsilon1$, and (c) $|BVS2-C\_S(0)|<\epsilon2$ (Steps #78, #82, #86). It should be noted that $\epsilon1$, $\epsilon2$ are specified discrimination reference values.

The above discrimination is made to assume based on the variation of the brightness in the light adjustment area CA0 whether the main object within the light adjustment area CA0 is moving right before the release operation after the AF control.

The case (a) is where the brightness difference is large, and there is assumed to be a high possibility that the main object has moved. The case (c) is where the brightness difference is small, and there is assumed to be low possibility that the main object has moved. Further, the case (b) is an intermediate case of the cases (a) and (c) where there is assumed to be possibility of intermediate level that the main object has moved.

Based on the respective discrimination results, the weight WT(0) for the light adjustment area CA0 is adjusted as follows.

(a) $\epsilon1<|BVS2-C\_S(0)|$ (NO in Step #78)
   WT(0) is changed to WT(0)/4. (Step #80)
(b) $\epsilon2<|BVS2-C\_S(0)|\leq\epsilon1$ (NO in Step #82)
   WT(0) is changed to WT(0)/2. (Step #84)
(c) $|BVS2-C\_S(0)|<\epsilon2$ (YES in Step #82)
   WT(0) is not changed. (Step #86)

In the case (c), since the main object image has barely moved in the light adjustment area CA0, the already set weight WT(0) for the light adjustment area CA0 is not changed. However, in the cases (b) and (a), the moved amount of the main object image in the light adjustment area CA0 increases in this order, and the possibility that the main object image is in the light adjustment area CA0 right before the release operation is assumed to be low. Accordingly, the already set weight WT(0) for the light adjustment area CA0 is decreased in steps in the above order, making the weight for the area CA0 in the light adjustment control smaller.

Upon completion of the adjustment of the weight WT(0) for the light adjustment area CA0, it is discriminated whether the count value is "4" (Step #90) after the counter i is incremented by 1 (Step #88). In this case, i<4 (NO in Step #90), this routine returns to Step #76 and subsequent steps to adjust the weight WT(1) for the light adjustment area CA1 by the processing similar to the above.

Hereafter, when the adjustments of the weights WT(2), WT(3) for the light adjustment area CA2, CA3 are completed (YES in Step #90), the data on the newly set weights WT(0) to WT(3) are output to the light adjusting circuit 7 (Step #92), thereby completing the weight setting operation.

Figure 24:
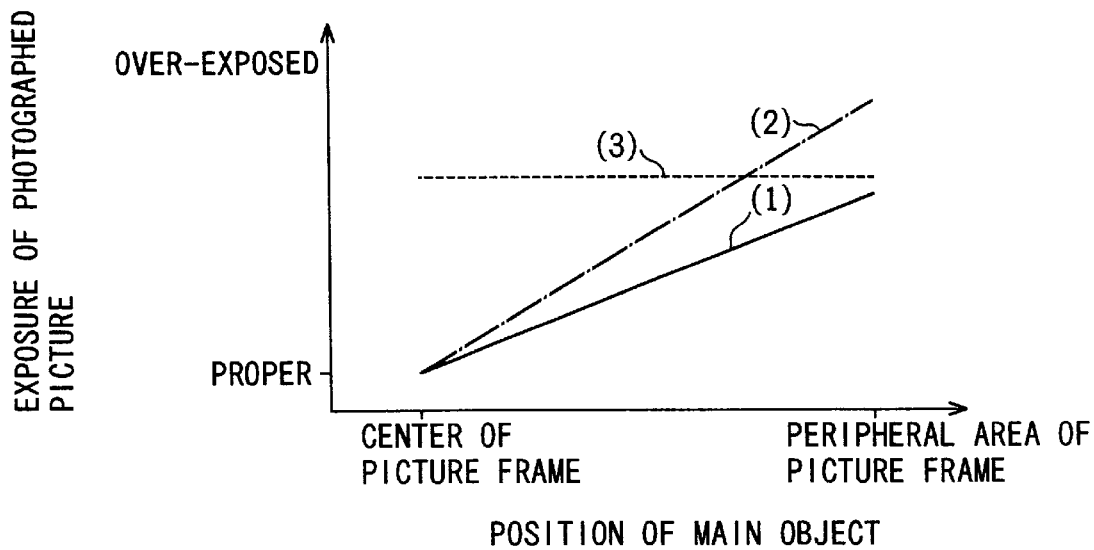
FIG. 24 is a graph showing an exposure effect when flash-assisted photography by multi-spot light adjustment is performed in an unreflective background scene.
Figure 25:
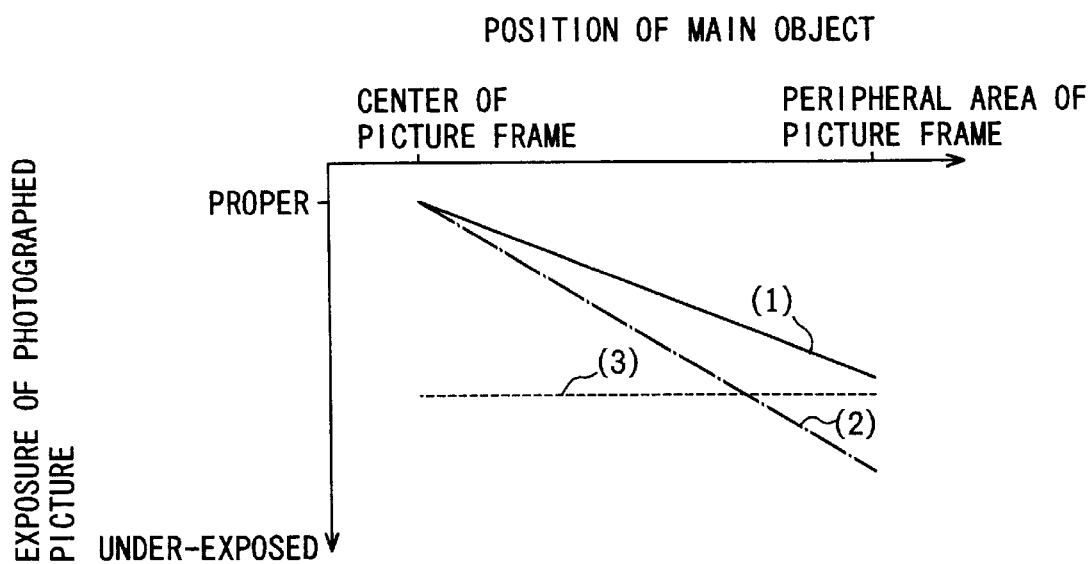
FIG. 25 is a graph showing an exposure effect when flash-assisted photography by multi-spot light adjustment is performed in a reflective background scene.

FIGS. 24, 25 are graphs showing the exposure effect of the photographed picture when flash-assisted photography is performed by the multi-spot light adjustment control. FIG. 24 shows a photographic view where there is nothing which reflects light in the background and, thus, the flash light propagates through behind the main object in the background area within the photographic view (hereafter, unreflective background scene). FIG. 25 shows a photographic view where there is something which reflects light in the background such as a golden screen, and the flash light is fairly reflected by the background area within the photographic view (hereafter, reflective background scene).

In FIGS. 24, 25, an abscissa is the position of the main object within the photographic view, and an ordinate is the exposure of the photographed picture. An exposure characteristic (1) is obtained in the case where the multi-spot light adjustment in accordance with the flowchart of FIGS. 22, 23 is performed; an exposure characteristic (2) is obtained in the case where the operations in Steps #46 to #50 and Steps #70 to #90 are not performed; and an exposure characteristic (3) is obtained in the case where the multi-spot light adjustment is not performed.

In the unreflective background scene, since an amount of reflected light is small as a whole, it takes a long time until the amount of light received by the light adjusting circuit 7 reaches the predetermined light adjustment level, with the result that the photographed picture tends to be over-exposed. Particularly in the case where the an average light adjustment is performed based on the entire image within the photographic view instead of performing the multi-spot light adjustment, the photographed picture is over-exposed regardless of the position of the main object (see the characteristic (3)).

In the case that the multi-spot light adjustment control is performed, as the main object image is located more center of the photographic view, the weights for the light adjustment areas CA1 to CA3 in the center of the photographic view are set larger. Accordingly, the flash light reflected by the main object is properly received and the exposure of the photographed picture is of proper level.

However, if the main object main is located on the peripheral area of the photographic view, an amount of flash light reflected by the main object decreases. Accordingly, as the main object image is located on the more peripheral area of the photographic view, the photographed picture tends to be more over-exposed. Particularly in the case that the main object image has moved to the peripheral area of the photographic view right before the exposure after the AF control, the photographed picture is exposed to a larger extent if flash-assisted photography is performed by the light adjustment control with a larger weight for the center of the photographic view set during the AF control (see the characteristic (2)).

In this embodiment, if the main object moves to the peripheral area of the photographic view right before the exposure after the AF control, the weights for the central light adjustment areas CA1 to CA3 are relatively set low according to the moved amount in the light adjustment control. Accordingly, the degree of over-exposure can be effectively suppressed (compare the characteristics (1) and (2).

On the other hand, in reflective background scene, since an amount of flash light reflected by the reflective background is excessive, the light reception amount of the light adjusting circuit 7 reaches the predetermined light adjustment level within a short period of time contrary to the unreflective background scene. Accordingly, the photographed picture tends to be under-exposed.

In the case that the multi-spot light adjustment control is performed, similar to the unreflective background scene, as the main object image is located more center of the photographic view, the flash light reflected by the main object is more properly received and the exposure of the photographed picture is of proper level. However, if the main object image is located in the peripheral area of the photographic view, a large amount of flash light is reflected by the reflective background. Therefore, as the main object is located in the more peripheral area, the photographed picture tends to be more under-exposed.

In this case, if the main object image has moved to the peripheral area of the photographic view right before the exposure after the AF control, the photographed picture is exposed to a smaller extent (see the characteristic (2)) if flash-assisted photography is performed by the light adjustment control with a larger weight for the center of the photographic view set during the AF control. In this embodiment, if the main object moves to the peripheral area of the photographic view right before the exposure after the AF control, the weights for the central light adjustment areas CA1 to CA3 are set relatively low according to the moved amount in the light adjustment control. Accordingly, the degree of under-exposure can be effectively suppressed (compare the characteristics (1) and (2).

Although this flowchart does not include such a step, the weights WT(0), WT(1), WT(2) and WT(3) may be set when a camera shake occurs between the AF control and the exposure since the position of the main object image within the photographic view changes. For example, the focal length f is compared with a specified value F1. If f>F1 by zooming, the influence of the camera shake is large. Therefore, the average light adjustment is performed based on the entire image within the photographic view by setting WT(0)=1, WT(l)=WT(2)=WT(3)=¼.

Next, the exposure effect of the photographed picture when flash-assisted photography is performed by the flash-assisted photographing system according to the invention is described.

TABLE-2 shows an example of flash firing control under a variety of conditions when the flash firing by the flash circuit 9 is controllably stopped by the earlier control signal SFL1.

TABLE 2

| LAC<br>FMC | UNDER-<br>EXPOSURE | PROPER<br>EXPOSURE | OVER-<br>EXPOSURE |
|---|---|---|---|
| UNDER-<br>EXPOSURE | LAC | LAC | FMC/LAC |
| PROPER<br>EXPOSURE | LAC | FMC/LAC | FMC |
| OVER-<br>EXPOSURE | FMC/LAC | FMC | FMC |

"UNDER-EXPOSURE" in the light adjustment control of TABLE-2 is a case where the light adjustment level is reached within a short period since the object is bright and, therefore, the exposure of the photographed picture is below the proper exposure level. "OVER-EXPOSURE" is a case where it takes a long time to reach the light adjustment level since the object is dark and, therefore, the exposure of the photographed picture exceeds the proper exposure level. "PROPER EXPOSURE" is a case where a proper light adjustment is performed because the object has neutral tints and the exposure of the photographed picture is proper.

"OVER-EXPOSURE" in the FM control is a case where the exposure of the photographed picture exceeds the proper exposure level due to a control error in driving the taking lens 11. "UNDER-EXPOSURE" is a case where the exposure of the photographed picture is below the proper exposure level due to the above control error. Further, "PROPER EXPOSURE" is a case where the influence of the control error is negligible and, therefore, the exposure of the photographed picture is of proper level.

Nine boxes of TABLE-2 show combinations of the exposure conditions of the flash-assisted photography by the FM control and the exposure condition of the flash-assisted photography by the light adjustment control. "LAC" and "FMC" in the respective boxes show the flash firing controls adopted by the flash circuit 9 in the corresponding exposure conditions.

For example, in the combination of the "UNDER-EXPOSURE" in the light adjustment control and the "OVER-EXPOSURE" in the FM control, the flash firing stop signal ST1 from the light adjusting circuit 7 is input to the flash firing control signal generating circuit 8 earlier than the flash firing signal ST2, and the light adjustment control is adopted to control the flash firing of the flash circuit 9. On the other hand, in the combination of the "OVER-EXPOSURE" in the light adjustment control and the "UNDER-EXPOSURE" in the FM control, the flash firing stop signal ST2 is input earlier than the flash firing signal ST1, and the FM control is adopted to control the flash firing of the flash circuit 9.

"FMC/LAC" is a case where the flash firing control of the flash circuit 9 cannot be simply determined, and the flash firing of the flash circuit 9 is controlled in accordance with the earlier one of the flash firing stop signals ST1 and ST2 input to the control signal generating circuit 8.

TABLE-3 shows the exposure results of the photographed pictures under a variety of conditions of TABLE-2 when a variation range of the exposure of the flash-assisted photography by the FM control and the light adjustment control is ±2.0 EV.

TABLE 3

| LAC<br>FMC | UNDER-<br>EXPOSURE<br>(−2.0 EV) | PROPER<br>EXPOSURE<br>(±0.0 EV) | OVER-<br>EXPOSURE<br>(+2.0 EV) |
|---|---|---|---|
| OVER-<br>EXPOSURE<br>(+2.0 EV) | −2.0 | ±0.0 | +2.0 |
| PROPER<br>EXPOSURE<br>(±0.0 EV) | −2.0 | ±0.0 | ±0.0 |
| UNDER-<br>EXPOSURE<br>(−2.0 EV) | −2.0 | −2.0 | −2.0 |

If the condition of the flash-assisted photography is expressed using the conditions "UNDER-EXPOSURE", "PROPER EXPOSURE" and "OVER-EXPOSURE" of the FM control and the light adjustment control (FMC-exposure control, LAC-exposure condition), the light adjustment control is performed in the cases (FMC-"OVER-EXPOSURE", LAC-"UNDER-EXPOSURE"), (FMC-"PROPER EXPOSURE", LAC-"UNDER-EXPOSURE") and (FMC-"OVER-EXPOSURE", LAC-"UNDER-EXPOSURE") of TABLE-3, the exposure is controlled at an exposure value based on the light adjustment control. When the object has bright tints, the exposure value decreases 2.0 EV. On the other hand, since the FM control is performed in the cases (FMC-"PROPER EXPOSURE", LAC-"OVER- EXPOSURE"), (FMC-"UNDER-EXPOSURE", LAC-"PROPER EXPOSURE") and (FMC-"UNDER-EXPOSURE", LAC-"OVER-EXPOSURE"), the exposure is controlled at an exposure value based on the FM control and, therefore, where the exposure value decreases 2.0 EV in close-up photography where the control error in driving the taking lens 11 is larger.

In the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), either one of the FM control and the light adjustment is adopted. Since the variation range of the exposure by the controls is the same, the exposure value increases 2.0 EV in the case (FMC-"OVER-EXPOSURE", LAC-"OVER-EXPOSURE") and decreases 2.0 EV in the case (FMC-"UNDER-EXPOSURE", LAC-"UNDER-EXPOSURE") regardless of which control is adopted.

According to TABLE-3, if flash-assisted photography is performed for a dark colored object locating at an intermediate or long distance from the camera, the flash firing control by the FM control is performed. Accordingly, the degree of over-exposure is reduced compared to the case where the flash-assisted photography is performed by the light adjustment control (see the exposure values written in italics in TABLE-3).

In TABLE-4, the flash firing control amount by the FM control is corrected by +1.5 EV in the cases of TABLE-3. In other words, the exposure of the flash photographed picture by the FM control is shifted by +1.5 EV.

TABLE 4

| LAC<br>FMC | UNDER-<br>EXPOSURE<br>(-2.0 EV) | PROPER<br>EXPOSURE<br>(±0.0 EV) | OVER-<br>EXPOSURE<br>(+2.0 EV) |
| --- | --- | --- | --- |
| OVER-<br>EXPOSURE<br>(+3.5 EV) | -2.0 | ±0.0 | +2.0 |
| PROPER<br>EXPOSURE<br>(+1.5 EV) | -2.0 | ±0.0 | +1.5 |
| UNDER-<br>EXPOSURE<br>(-0.5 EV) | -2.0 | -0.5 | -0.5 |

According to TABLE-4, since the exposure value of the light adjustment control is small in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST1 from the light adjusting circuit 7 is input to the flash firing control signal generating circuit 8 earlier than the flash firing stop signal ST2 from the CPU 1, with the result that the flash firing of the flash circuit 9 is controlled by the light adjustment control. Thus, the exposure is controlled at an exposure value based on the light adjustment control.

In the cases of TABLE-4, the degree of over-exposure when the flash-assisted photography is performed for a dark-colored object at an intermediate or long distance from the camera can be reduced, and a variation of the exposure of the flash-assisted photography for an object having neutral tints can be reduced as compared to the cases of TABLE-3 (see the exposure values written in italics in TABLE-4).

In TABLE-5, the flash firing control amount by the light adjustment control is corrected by +1.5 EV in the cases of TABLE-3. In other words, the exposure of the flash photographed picture by the light adjustment control is shifted by 1.5 EV.

TABLE 5

| LAC<br>FMC | UNDER-<br>EXPOSURE<br>(-0.5 EV) | PROPER<br>EXPOSURE<br>(±1.5 EV) | OVER-<br>EXPOSURE<br>(+3.5 EV) |
| --- | --- | --- | --- |
| OVER-<br>EXPOSURE<br>(+2.0 EV) | -0.5 | +1.5 | +2.0 |
| PROPER<br>EXPOSURE<br>(±0.0 EV) | -0.5 | ±0.0 | ±0.0 |
| UNDER-<br>EXPOSURE<br>(-2.0 EV) | -2.0 | -2.0 | -2.0 |

According to TABLE-5, since the exposure value of the FM control is small in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST2 from the CPU 1 is input to the flash firing control signal generating circuit 8 earlier than the flash firing stop signal ST1, with the result that the flash firing of the flash circuit 9 is controlled by the FM control. Thus, the exposure is controlled at an exposure value based on the FM control.

In the cases of TABLE-5, the degree of under-exposure and the variation of the exposure when the flash-assisted photography is performed for an object having a bright color or neutral tints and located at an intermediate or long distance from the camera can be reduced as compared to the cases of TABLE-3 (see the exposure values written in italics in TABLE-5).

In TABLE-6, the flash firing control amount by the FM control is corrected by -1.5 EV in the cases of TABLE-3. In TABLE-7, the flash firing control amount by the light adjustment control is corrected by -1.5 EV in the cases of TABLE-3.

TABLE 6

| LAC<br>FMC | UNDER-<br>EXPOSURE<br>(-2.0 EV) | PROPER<br>EXPOSURE<br>(±0.0 EV) | OVER-<br>EXPOSURE<br>(+2.0 EV) |
| --- | --- | --- | --- |
| OVER-<br>EXPOSURE<br>(+0.5 EV) | -2.0 | ±0.0 | +0.5 |
| PROPER<br>EXPOSURE<br>(-1.5 EV) | -2.0 | -1.5 | -1.5 |
| UNDER-<br>EXPOSURE<br>(-3.5 EV) | -3.5 | -3.5 | -3.5 |

TABLE 7

| LAC<br>FMC | UNDER-<br>EXPOSURE<br>(-3.5 EV) | PROPER<br>EXPOSURE<br>(-1.5 EV) | OVER-<br>EXPOSURE<br>(+0.5 EV) |
| --- | --- | --- | --- |
| OVER-<br>EXPOSURE<br>(+2.0 EV) | -3.5 | +1.5 | +0.5 |
| PROPER<br>EXPOSURE<br>(±0.0 EV) | -3.5 | -1.5 | ±0.0 |
| UNDER-<br>EXPOSURE<br>(-2.0 EV) | -3.5 | -2.0 | -2.0 |

According to TABLE-6, since the exposure value of the FM control is small in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST2 from the CPU 1 is input to the flash firing control signal generating circuit 8 earlier than the flash firing stop signal ST1 from the light adjusting circuit 7, with the result that the flash firing of the flash circuit 9 is controlled by the FM control. Thus, the exposure is controlled at an exposure value based on the FM control.

According to TABLE-7, since the exposure value of the light adjustment control is small in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST1 from the light adjusting circuit 7 is input to the flash firing control signal generating circuit 8 earlier than the flash firing stop signal ST1 from the CPU 1, with the result that the flash firing of the flash circuit 9 is controlled by the light adjustment control. Thus, the exposure is controlled at an exposure value based on the light adjustment control.

The cases of TABLE-6 and TABLE-7 are effective when the flash-assisted photography is intentionally performed so as to be under-exposed since the photographed picture tends to be under-exposed as a whole. For example, when macro-photographing is performed using a diffusion plate, the object is located at a short distance despite a large projected amount of the taking lens 11. Accordingly, it is necessary to photograph so as to be under-exposed by suppressing the amount of flash light. In such a case, a suitable exposure can be obtained by correcting the exposure value based on the light adjustment control or the FM control by a negative value.

TABLE-8 shows the flash firing controls under a variety of conditions when the flash firing control signal generating circuit 8 is formed by the circuit shown in FIG. 16 and the flash firing of the flash circuit 9 is controllably stopped in accordance with the later control signal SFL2.

TABLE 8

| LAC<br>FMC | UNDER-<br>EXPOSURE | PROPER<br>EXPOSURE | OVER-<br>EXPOSURE |
|---|---|---|---|
| UNDER-EXPOSURE | FMC | FMC | FMC/LAC |
| PROPER EXPOSURE | FMC | FMC/LAC | LAC |
| OVER-EXPOSURE | FMC/LAC | LAC | LAC |

The meanings of "UNDER-EXPOSURE", "PROPER EXPOSURE", "OVER-EXPOSURE", "LAC", "FMC" and "FMC/LAC" of TABLE-8 are same as those of TABLE-2.

When the flash firing of the flash circuit 9 is stopped in accordance with the later control signal SFL2, it is in principle stopped in accordance with the later one of the flash firing stop signal ST1 from the light adjusting circuit 7 and the flash firing stop signal ST2 from the CPU 1 input to the flash firing control signal generating circuit 8. Accordingly, "FMC" and "LAC" in TABLE-2 are exchanged in TABLE-8.

TABLE-9 shows the exposure results of the photographed pictures under a variety of conditions of TABLE-8 when a variation range of the exposure of the flash-assisted photography by the FM control and the light adjustment control is ±2.0 EV.

TABLE 9

| LAC<br>FMC | UNDER-<br>EXPOSURE<br>(−2.0 EV) | PROPER<br>EXPOSURE<br>(±0.0 EV) | OVER-<br>EXPOSURE<br>(+2.0 EV) |
|---|---|---|---|
| OVER-EXPOSURE (+2.0 EV) | +2.0 | +2.0 | +2.0 |
| PROPER EXPOSURE (±0.0 EV) | ±0.0 | ±0.0 | +2.0 |
| UNDER-EXPOSURE (−2.0 EV) | −2.0 | ±0.0 | +2.0 |

According to TABLE-9, if flash-assisted photography is performed for a white colored object locating at a short or intermediate distance from the camera, the flash firing control by the FM control is performed. Accordingly, the degree of underexposure is reduced compared to the case where the flash-assisted photography is performed by the light adjustment control (see the exposure values written in italics in TABLE-9).

In TABLE-10, the flash firing control amount by the FM control is corrected by +1.5 EV in the cases of TABLE-9. In TABLE-11, the flash firing control amount by the light adjustment control is corrected by +1.5 EV in the cases of TABLE-9.

TABLE 10

| LAC<br>FMC | UNDER-<br>EXPOSURE<br>(−2.0 EV) | PROPER<br>EXPOSURE<br>(±0.0 EV) | OVER-<br>EXPOSURE<br>(+2.0 EV) |
|---|---|---|---|
| OVER-EXPOSURE (+3.5 EV) | +3.5 | +3.5 | +3.5 |
| PROPER EXPOSURE (±1.5 EV) | +1.5 | +1.5 | +2.0 |
| UNDER-EXPOSURE (−0.5 EV) | −0.5 | ±0.0 | +2.0 |

TABLE 11

| LAC<br>FMC | UNDER-<br>EXPOSURE<br>(−0.5 EV) | PROPER<br>EXPOSURE<br>(+1.5 EV) | OVER-<br>EXPOSURE<br>(+3.5 EV) |
|---|---|---|---|
| OVER-EXPOSURE (+2.0 EV) | +2.0 | +2.0 | +3.5 |
| PROPER EXPOSURE (±0.0 EV) | ±0.0 | +1.5 | +3.5 |
| UNDER-EXPOSURE (−2.0 EV) | −0.5 | +1.5 | +3.5 |

According to TABLE-10, since the exposure value of the FM control is large in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST2 from the CPU 1 is input to the flash firing control signal generating circuit 8 later than the flash firing stop signal ST1 from the light adjusting circuit 7, with the result that the flash firing of the flash circuit 9 is controlled by the FM control. Thus, the exposure is controlled at an exposure value based on the FM control.

On the other hand, according to TABLE-10, since the exposure value of the light adjustment control is large in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST1 from the light adjusting circuit 7 is input to the flash firing control signal generating circuit 8 later than the flash firing stop signal ST2 from the CPU 1, with the result that the flash firing of the flash circuit 9 is controlled by the light adjustment control. Thus, the exposure is controlled at an exposure value based on the light adjustment control.

The cases of TABLE-10 and TABLE-11 are effective when the flash-assisted photography is intentionally performed so as to be over-exposed since the photographed picture tends to be over-exposed as a whole. For example, when flash-assisted photography is performed using a ND filter or the like which restricts a light amount, a suitable exposure can be obtained by correcting the exposure value based on the light adjustment control or the FM control by a positive value.

In TABLE-12, the flash firing control amount by the FM control is corrected by −1.5 EV in the cases of TABLE-9. In other words, the exposure of the flash photographed picture by the FM control is shifted by −1.5 EV.

TABLE 12

| LAC<br>FMC | UNDER-<br>EXPOSURE<br>(−2.0 EV) | PROPER<br>EXPOSURE<br>(±0.0 EV) | OVER-<br>EXPOSURE<br>(+2.0 EV) |
|---|---|---|---|
| OVER-<br>EXPOSURE<br>(+0.5 EV) | +0.5 | +0.5 | +2.0 |
| PROPER<br>EXPOSURE<br>(−1.5 EV) | −1.5 | ±0.0 | +2.0 |
| UNDER-<br>EXPOSURE<br>(−3.5 EV) | −2.0 | ±0.0 | +2.0 |

According to TABLE-12, since the exposure value of the light adjustment control is large in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST1 from the light adjusting circuit 7 is input to the flash firing control signal generating circuit 8 later than the flash firing stop signal ST2 from the CPU 1, with the result that the flash firing of the flash circuit 9 is controlled by the light adjustment control. Thus, the exposure is controlled at an exposure value based on the light adjustment control.

In the cases of TABLE-12, the extent of the over-exposure and the variation of the exposure when the flash-assisted photography is performed for an object having a bright color or neutral tints and located at a short or intermediate distance from the camera can be reduced as compared to the cases of TABLE-9 (see the exposure values written in italics in TABLE-12).

In TABLE-13, the flash firing control amount by the light adjustment control is corrected by −1.5 EV in the cases of TABLE-9. In other words, the exposure of the picture obtained by flash-assisted photography by the light adjustment control is shifted by +1.5 EV.

TABLE 13

| | UNDER-<br>EXPOSURE<br>(−3.5 EV) | PROPER<br>EXPOSURE<br>(−1.5 EV) | OVER-<br>EXPOSURE<br>(+0.5 EV) |
|---|---|---|---|
| OVER-<br>EXPOSURE<br>(+2.0 EV) | +2.0 | −2.0 | +2.0 |
| PROPER<br>EXPOSURE<br>(±0.0 EV) | ±0.0 | ±0.0 | +0.5 |
| UNDER-<br>EXPOSURE<br>(−2.0 EV) | −2.0 | −1.5 | +0.5 |

According to TABLE-13, since the exposure value of the FM control is large in any of the cases (FMC-"OVER-EXPOSURE", LAC-"OVER-EXPOSURE"), (FMC-"PROPER EXPOSURE", LAC-"PROPER EXPOSURE") and (FMC-"UNDER-EXPOSURE", LAC-"UNDER-EXPOSURE"), the flash firing stop signal ST2 from the CPU 1 is input to the flash firing control signal generating circuit 8 later than the flash firing stop signal ST1 from the light adjusting circuit 7, with the result that the flash firing of the flash circuit 9 is controlled by the FM control. Thus, the exposure is controlled at an exposure value based on the FM control.

In the cases of TABLE-13, the extent of the over-exposure and the variation of the exposure when the flash-assisted photography is performed for a black object at a short or intermediate distance from the camera can be reduced as compared to the cases of TABLE-9 (see the exposure values written in italics in TABLE-13).

Next, another flash-assisted photographing system will be described with reference to FIGS. 26 and 27. In the forgoing embodiment, selection of the FM control and the light adjustment control is performed after the flash is fired. In this embodiment, selection of the FM control and the light adjustment control is performed before the flash is fired.

Figure 26:
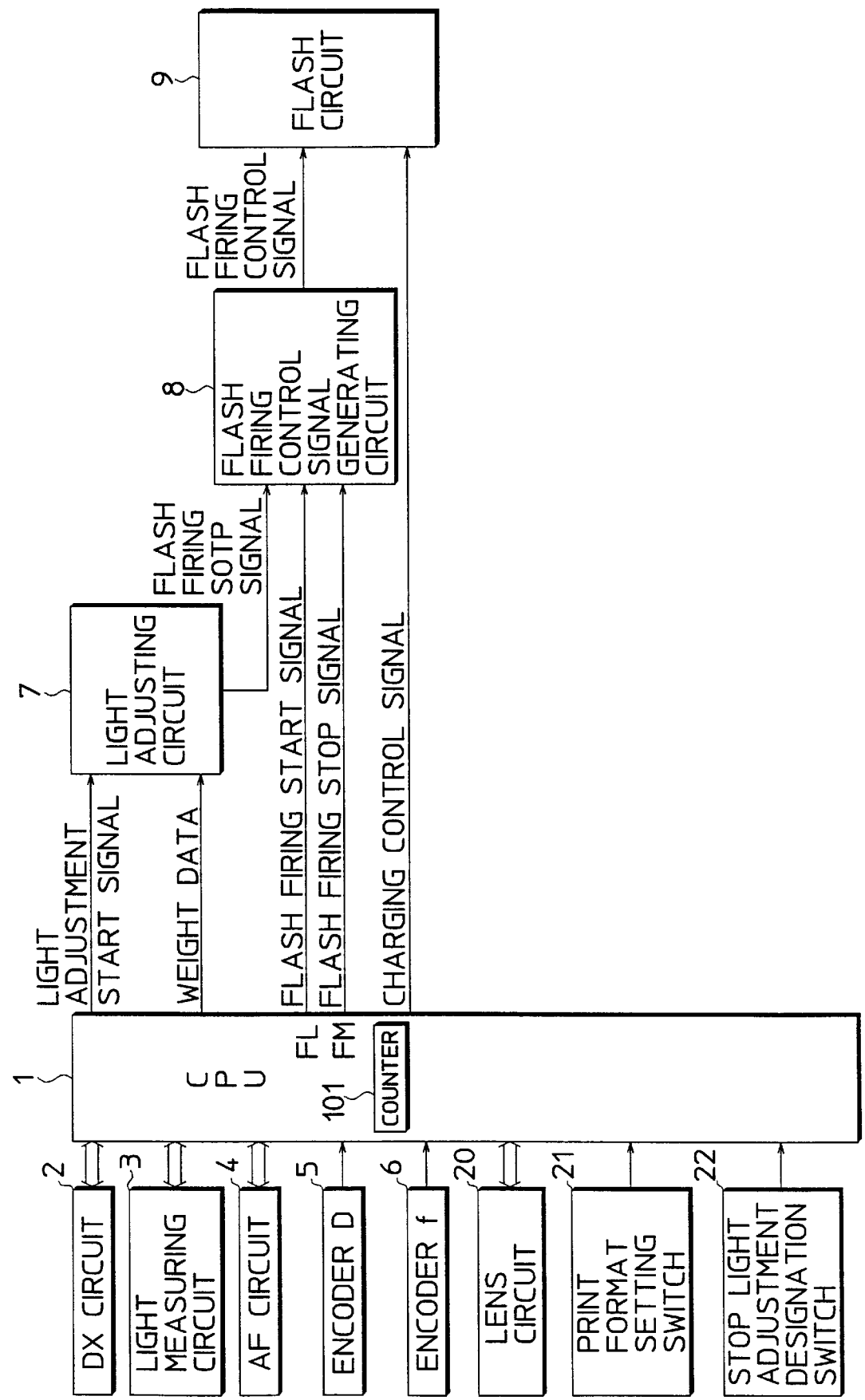
FIG. 26 is a block diagram of a control system of another flash-assisted photographing system embodying the present invention.

FIG. 26 shows a construction of a control system of a flash-assisted photographing system of this embodiment which is basically identical to that of the flash-assisted photographing system shown in FIG. 1. Accordingly, parts similar to those described with the forgoing embodiment are indicated at the same numerals and description of those are omitted.

In this embodiment, there are additionally provided a lens circuit 20, a print format setting switch 21, and a spot light adjustment designation switch 22.

The lens circuit 20 detects lens information including an aperture value ($F_{No}$) set in a taking lens 11 and a distance PZ between a center of pupil of the taking lens 11 and a film surface F. The print format setting switch 21 is provided at a camera main body to designate a format for a print made from a photographed image.

An exposure region G is set to H-format size and, accordingly, an object image is photographed on the film in H-format. The print format setting switch 21 enables a camera operator to designate the S-format or P-format as a print format for the image photographed in H-format.

The print format information set by the setting switch 21 is recorded on the magnetic recording portions formed in correspondence with the respective frames or on a storing portion of a film cartridge.

The spot light adjustment designation switch 22 is provided on the camera main body, and is operated to designate the light adjustment control only by a light adjustment area CA2 in the center of the photographic view in the multi-spot light adjustment control. Thus, the camera operator wishing the light adjustment centering the main object image located in the center of the photographic view can manually designate such a light adjustment.

In this embodiment, the CPU 1 selects either one of the FM control and the multi-spot light adjustment control based on a magnification β and an object distance D to be described later, and controls the flash firing amount of a flash circuit 9.

A flash firing control signal generating circuit 8 generates a flash firing control signal SFL by the multi-spot light adjustment control based on the flash firing start signal ST0 output from the CPU 1 and the flash firing stop signal ST1 output from a light adjusting circuit 7, and a flash firing control signal SFL by the FM control based on the flash firing start signal ST0 and the flash firing stop signal ST2.

The flash firing period $T_{FM}$ is a period during which the flash device is fired so as to emit flash light corresponding to a proper flash firing amount of the flash circuit 9 calculated based on the aperture value F set in the taking lens 11 and the object distance D detected by an encoder 5.

When the FM method is selected, the flash firing stop signal ST1 is not input to the control signal generating circuit 8 from the light adjusting circuit 7. Accordingly, the flash firing control signal SFL (flash firing control signal by the FM control) generated based on the signals ST0 and ST2 is input to the flash circuit 9 from the control signal generating circuit 8. The flash firing start and stop timings and the flash firing amount of the flash circuit 9 are controlled in accordance with this flash firing control signal SFL.

On the other hand, when the flash firing amount is controlled by the multi-spot light adjustment method, the CPU 1 outputs the flash firing start signal ST0 to the control signal generating circuit 8, but not the flash firing stop signal ST2 since the flash firing stop signal is output to the flash circuit 9 from the light adjusting circuit 7. The light adjusting circuit 7 starts a light adjustment upon the receipt of the light adjustment start signal, and outputs the flash firing stop signal ST1 to the control signal generating circuit 8 when the amount of flash light reflected by the object reaches the predetermined light adjustment level.

When the multi-spot light adjustment method is selected, the flash firing stop signal ST2 is not input to the control signal generating circuit 8 from the CPU 1. Accordingly, the flash firing control signal SFL (flash firing control signal by the multi-spot light adjustment control) generated based on the signals ST0 and ST1 is input to the flash circuit 9 from the control signal generating circuit 8. The flash firing start and stop timings and the flash firing amount of the flash circuit 9 are controlled in accordance with this flash firing control signal SFL.

The flash firing control signal generating circuit 8 has an identical construction to the flash firing control signal generating circuit 8 shown in FIG. 16. Specifically, an OR circuit 83 takes a logical product of the flash firing stop signals ST1 and ST2; an AND circuit 82 takes a logical sum of the logical product signal and the flash firing start signal ST0; and this logical sum signal is output as the flash firing control signal SFL.

Since the signals ST1 and ST2 are not simultaneously input to the OR circuit 83, upon the input of either one of these signals, this input signal is output from the OR circuit 83. Accordingly, the AND circuit 82 outputs the logical sum signal of the flash firing stop signal ST1 or ST2 input to the OR circuit 83 and the flash firing start signal ST0.

For example, if the FM method is selected, the flash firing stop signal ST2 is output from the OR circuit 83 as shown in FIG. 17, the AND circuit 82 outputs the flash firing control signal SFL which rises (turn-on) upon the rise of the flash firing start signal ST0 and falls (turn-off) upon the fall of the flash firing stop signal ST2.

On the other hand, if the multi-spot light adjustment method is selected, the AND circuit 82 outputs the flash firing control signal SFL which rises (turn-on) upon the rise of the flash firing start signal ST0 and falls (turn-off) upon the fall of the flash firing stop signal ST1.

Figure 27:
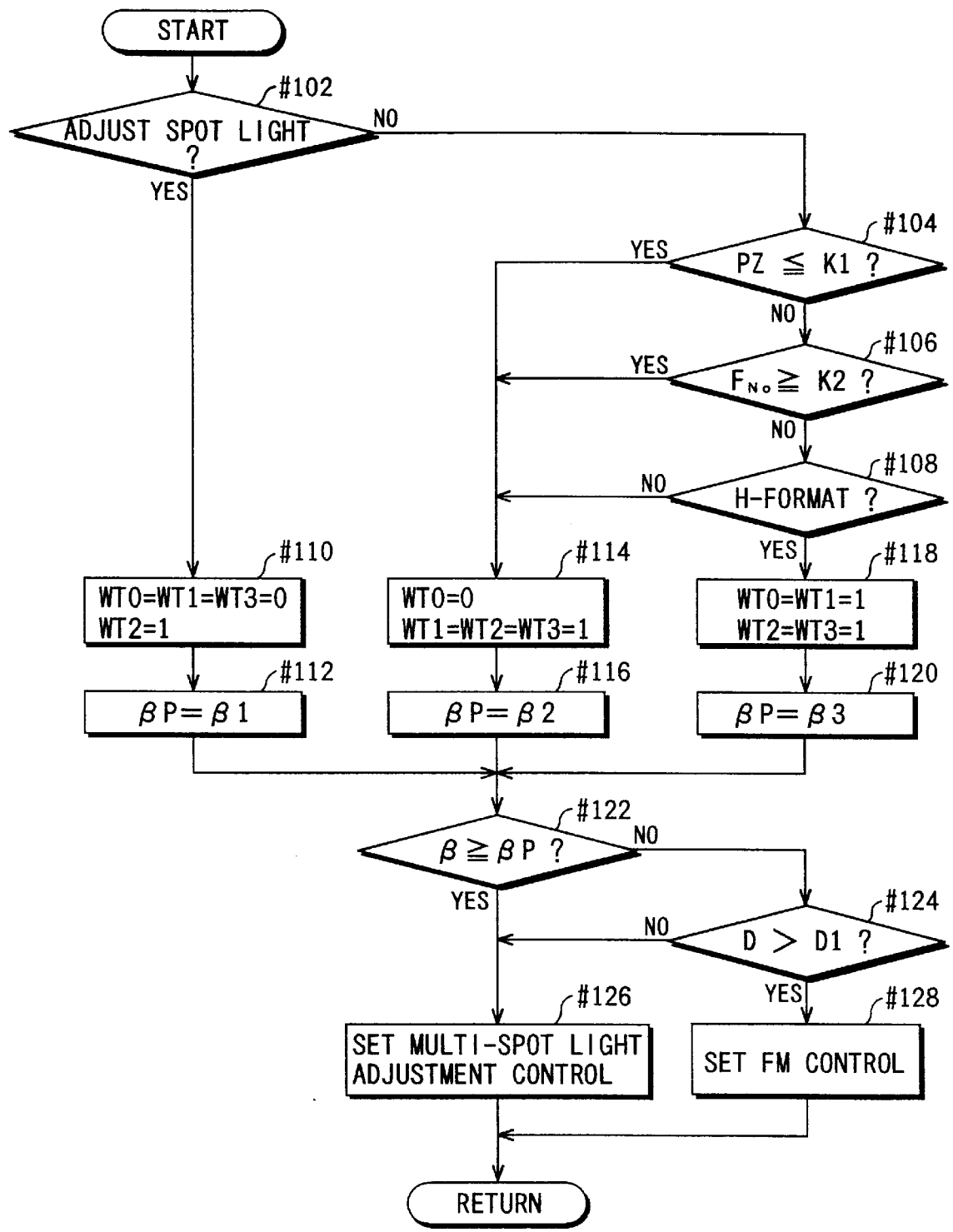
FIG. 27 is a flowchart showing a switching operation of an FM control and a multi-spot light adjustment control executed in the another flash-assisted photographing system.

Next, the selection of the FM method and the multi-spot light adjustment method in flash-assisted photography is described with respect to a flowchart of FIG. 27.

FIG. 27 is a flowchart for controlling switching of the FM method and the multi-spot light adjustment control in flash-assisted photography, and is implemented during the photographing preparatory operation such as AF/AE control performed when the release button is pressed halfway.

In this flowchart, the print format settable by the print format setting switch 21 are limited to H-format and P-format.

Upon entering the flowchart, whether the spot light adjustment has been designated by the spot light adjustment designation switch 22 is discriminated (Step #102). If the spot light adjustment has been designated (YES in Step #102), the weights for the respective light adjustment areas CA0 to CA3 are set: WT0=WT1=WT3=0, WT2=1 (Step #110). Further, a threshold value βP of the magnification β is set to a predetermined value β1 (Step #112).

If the spot light adjustment has not been designated (NO in Step #102), it is discriminated whether the distance PZ between the center of pupil of the taking lens 11 and the film surface F which was detected by the lens circuit 20 is not longer than a predetermined value K1 (e.g., 50 mm) (Step #104). In Step #106, it is discriminated whether the aperture value $F_{No}$ of the taking lens 14 detected by the lens circuit 20 is not smaller than a predetermined value K2 (e.g., F8). In Step #108, it is discriminated whether the H-format has been set by the print format setting switch 21. If PZ≦K1 (YES in Step #104), $F_{No}$≧K2 (YES in Step #106) or the H-format is set (YES in Step #108), the weights WT0 to WT3 are set: WT0=0, WT1=WT2=WT3=1 (Step #114). Further, the threshold value βP is set to a predetermined value β2 (>β1) (Step #116).

If PZ>K1 (NO in Step #104) and $F_{No}$<K2 (NO in Step #106) and the P-format is set (NO in Step #108), the weights WT0 to WT3 are set: WT0=WT1=WT2=WT3=1 (Step #118). Further, the threshold value βP is set to a predetermined value β3 (>β2>β1) (Step #120).

Since the setting of the spot light adjustment means that the camera operator has designated flash-assisted photography centering the main object image located in the center of the photographic view, the light adjustment is performed only in the light adjustment area CA2 in the very center of the photographic view. Accordingly, only the weight for the light adjustment area CA2 is set at "1".

In the case that PZ≦K1 or $F_{No}$≧K2, an insufficient amount of reflected light from the object is incident upon the peripheral part of the light adjustment area 701 of the light adjusting circuit 7, making the light adjustment area 701 substantially smaller. In this case, since the peripheral part of the light adjustment area 701 is not involved in the light adjustment very much, only the weights WT1 to WT3 of the central light adjustment areas CA1 to CA3 are set at "1", thereby performing a light adjustment centering of the central part of the photographic view. In the case that the P-format is set, the print region is a central part of the photographic view. Accordingly, in order to obtain an optimal exposure for this central part, similar to the case where $PZ \leq K1$ or $F_{No} \geq K2$, only the weights WT1 to WT3 of the central light adjustment areas CA1 to CA3 are set at "1", thereby performing a light adjustment centering on the central part of the photographic view.

On the other hand, if $PZ>K1$ and $F_{No}<K2$ or if the H-format is set, the light adjustment area 701 does not become substantially smaller, and it is necessary to perform a suitable exposure for the entire photographic view. Accordingly, the weights WT0 to WT3 of all light adjustment areas CA0 to CA3 are set at "1" so that an average light adjustment can be performed within the entire photographic view.

The magnification threshold value $\beta P$ is a point where the multi-spot light adjustment control and the FM control are switched. The reason why the threshold value $\beta P$ is made smaller as the light adjustment area is more concentrated in the center of the photographic view is that the actual light adjustment areas in the respective light adjustment modes: the spot light adjustment, central light adjustment and average light adjustment, are CA2, CA1 to CA3, CA0 to CA3, respectively, i.e., smallest in the case of the spot light adjustment and largest in the case of the average light adjustment.

For example, in a photographic view having a high reflective background such as a person standing against a gold screen (hereafter, high reflective photographic view) and a photographic view having a low reflective background such a person standing in the dark (hereafter, low reflective photographic view), flash-assisted photography by the multi-spot light adjustment control is largely influenced by an amount of flash light reflected by the background if the background image falls within the light adjustment area. As a result, the exposure is not suitable.

Thus, according to the invention, when the light adjustment area is influenced by the background depending upon the photographic view, i.e., when the background image falls within the actual light adjustment area, the flash firing amount is controlled by the FM control. On the other hand, when the light adjustment area is not influenced by the background (the background image does not fall within the actual light adjustment area), the flash firing amount is controlled by the multi-spot light adjustment control.

Since the actual light adjustment area is smallest in the spot light adjustment, the size of the main object image such as an image of a person within the photographic view is relatively small, i.e., the light adjustment area CA2 is taken up by this image of the person even if the magnification $\beta$ is relatively small. Accordingly, the switch point $\beta P$ at which the control is switched to the multi-spot light adjustment control is set smallest. On the other hand, since the actual light adjustment area is largest in the average light adjustment, the size of the main object image such as an image of a person within the photographic view is relatively large, i.e., the background image may fall on the light adjustment areas CA0 to CA3 even if the magnification $\beta$ is relatively large. Accordingly, the switch point $\beta P$ is set largest. Since the size of the actual light adjustment area in the central light adjustment is between that of the spot light adjustment and that of the average light adjustment, the switch point $\beta P$ is set between that of the spot light adjustment and that of the average light adjustment.

It should be noted that the specific threshold values $\beta 1$ to $\beta 3$ of the switch point $\beta P$ are suitable values empirically or experimentally obtained.

If the threshold value $\beta P$ of the magnification $\beta$ is set, it is then discriminated whether the magnification $\beta$ calculated based on the object distance D and the focal length f is not smaller than the threshold value $\beta P$ (Step #122). The magnification $\beta$ is calculated by the CPU 1 based on the object distance D detected by the encoder 5 and the focal length f detected by the encoder 6 in accordance with an operation expression: $\beta = k \cdot f/D$ (where k is a proportional coefficient).

The above discrimination is made to assume whether the actual light adjustment area is completely taken up by the main object image. If $\beta \geq \beta P$ (YES in Step #122), the multi-spot light adjustment control is set (Step #126) upon the assumption that the actual light adjustment area is completely taken up by the main object image, and this routine returns.

If $\beta < \beta P$ (NO in Step #122), it is discriminated whether the object distance D exceeds a predetermined value D1 (Step #124). The multi-spot light adjustment is set (Step #126) if $D \leq D1$ (NO in Step #124), whereas the FM control is set (Step #128) if $D > D1$ (YES in Step #124), and this routine returns.

The discrimination based on the object distance D is made to discriminate whether or not close-up photography in which the object is within a specified short distance from the camera is to be performed. A diffusion plate is highly likely to be mounted on the taking lens 14 in order to improve the orientation characteristic of the flash light in close-up photography. The mount of the diffusion plate may deteriorate the orientation characteristic of the flash light if the object distance is exceedingly short.

Thus, even in a photographic view where the actual light adjustment area is influenced by the background, the multi-spot light adjustment control is performed for the proper flash firing control in such close-up photography in which the orientation characteristic of the flash light is deteriorated.

If the FM control is set as the flash firing control, the CPU 1 sets, first in flash-assisted photography, the flash firing period $T_{FM}$ based on the aperture value F, the object distance D and the detection precision of the object distance D. Subsequently, a charging control signal SC is output from the CPU 1 to the flash circuit 9, thereby starting the charging of the flash circuit 9.

Upon the completion of the charging of the flash circuit 9, the CPU 1 outputs the flash firing start signal ST0 to the flash firing control signal generating circuit 8 at a specified timing, and starts counting the flash firing period by a counter 101. The flash firing start signal ST0 is input to the flash circuit 9 as it is via the circuit 8, and the flash device is fired at an input timing of the signal ST0.

Upon the lapse of the flash firing period $T_{FM}$, the flash firing stop signal ST2 is input to the flash circuit 9 via the control signal generating circuit 8, and the flash firing is stopped at an input timing of the signal ST2.

On the other hand, if the multi-spot light adjustment is set, the CPU 1 outputs the charging control signal SC to the flash circuit 9, thereby starting the charging of the flash circuit 9. The CPU 1 also sends the weight data WT0 to WT3 and the light adjustment level signal to the light adjusting circuit 7, thereby setting the weights for the respective light adjustment areas CA0 to CA3 and the reference voltage $V_R$.

Upon the completion of the charging of the flash circuit 9, the CPU 1 outputs the flash firing start signal ST0 to the flash firing control signal generating circuit 8 and outputs the light adjustment start signal to the light adjusting circuit 7 at specified timings. The flash firing start signal ST0 is input to the flash circuit 9 as it is via the circuit 8, and the flash device is fired at an input timing of the signal ST0.

Thereafter, when the amount of flash light reflected by the object and received by the light adjusting circuit 7 reaches the specified light adjustment level, the flash firing stop signal ST2 is input to the flash circuit 9 via the control signal generating circuit 8, and the flash firing is stopped at an input timing of the signal ST2.

While the invention has been described in detail, the foregoing description is in all aspects illustrative and not restrictive. It is understood that numerous other modifications and variations can be devised without departing from the scope of the invention.

What is claimed is:

1. A flash-assisted photographing system including a camera provided with a taking lens capable of varying the focal length and a flash, the flash-assisted photographing system comprising:

a light receiving unit having a plurality of receiving areas operable to separately receive light reflected by different areas of a photographic view;

a detector operable to detect a focal length of the taking lens; and a control that includes means for setting weights for outputs of each of the receiving areas based on a detected focal length, said controller further includes means for adding the outputs for the receiving areas which have been weighted by the weights and to stop flash emission upon an addition of the weighted outputs reaching a predetermined value.

2. A flash-assisted photographing system as defined in claim 1, further comprising:

a distance detector operable to detect a distance to an object; and a calculator operable to calculate a magnification from a detected focal length and a detected object distance:

wherein the controller sets weights for the receiving areas based on a calculated magnification.

3. A flash-assisted photographing system as defined in claim 2, wherein the controller sets weights for the receiving areas in accordance with a product of a detected focal length and a calculated magnification.

4. A flash-assisted photographing system as defined in claim 3, further comprising:

a light measuring unit operable to measure a brightness of a center of the photographic view at a first timing predetermined time before an exposure and at a second timing closer to the exposure than the first timing;

a discriminator operable to discriminate based on light measurements of the light measuring unit whether an object has moved; and a corrector responsive to the discriminator and operable to correct a product of a detected focal length and a calculated magnification when the object is discriminated to have moved.

5. A flash-assisted photographing system as defined in claim 3, further comprising:

a light measuring unit operable to measure respective brightness of different areas of the photographic view at a first timing predetermined time before an exposure and at a second timing closer to the exposure than the first timing;

a first calculating unit operable to calculate a brightness of a main object from respective light measurements obtained at the first timing;

a second calculating unit operable to calculate respective brightnesses of areas corresponding to the receiving areas of the light receiving unit from respective light measurements obtained at the second timing; and a corrector operable to correct weights for the receiving areas based on a calculated brightness of the main object and calculated brightnesses of areas corresponding to the receiving areas.

6. A flash-assisted photographing system as defined in claim 1, wherein said detector includes an encoder provided in the taking lens which outputs code data representing the focal length of the taking lens.

7. A flash-assisted photographing system as defined in claim 1, wherein the reflected light includes light emitted by said flash, and said photographing system further comprising:

a calculator which calculates and determines a light emission terminating timing by means of outputs of said light receiving unit and the weights set by said controller; and a light emission controller which terminates the light emission of said flash.

8. A flash-assisted photographing system as defined in claim 1, wherein the outputs of the receiving areas are currents.

9. A flash-assisted photographing system including a camera provided with a taking lens capable of varying the focal length and a flash, the flash-assisted photographing system comprising:

a light receiver having a plurality of receiving areas operable to separately receive light emitted by the flash and reflected by different areas of a photographic view; and a controller operable to receive a signal which represents a focal length of the taking lens, and to set weights for the receiving areas based on the received signal.

10. A flash-assisted photographing system as defined in claim 9, further comprising a distance detector operable to detect a distance to an object from the system.

11. A flash-assisted photographing system as defined in claim 10, further comprising a calculator operable to calculate a magnification by means of the focal length and the distance to the object.

12. A flash-assisted photographing system as defined in claim 11, wherein said controller sets weights for the receiving areas in accordance with a product of the focal length and the magnification.

13. A flash-assisted photographing system as defined in claim 12, further comprising:

an object movement detector which detects whether the object has moved; and a corrector responsive to the object movement detector and operable to correct the product of the focal length and the magnification when the object movement is detected.

14. A flash-assisted photographing system as defined in claim 9, further comprising:

a light measuring unit operable to measure brightness of a center of the photographic view at a first predetermined time before an exposure and at a second time closer to the exposure than the first time;

a discriminator operable to discriminate based on light measurements of the light measuring unit whether an object has moved; and a corrector responsive to the discriminator and operable to correct a product of a detected focal length and a calculated magnification when the object is discriminated to have moved.

15. A flash-assisted photographing system as defined in claim 9, further comprising:

a light measuring unit operable to measure respective brightness of different areas of the photographic view at a first predetermined time before an exposure and at a second time closer to the exposure than the first time;

a first calculating unit operable to calculate a brightness of a main object from respective light measurements obtained at the first time;

a second calculating unit operable to calculate respective brightness of areas corresponding to the receiving areas of the light receiving unit from respective light measurements obtained at the second time; and a corrector operable to correct weights for the receiving areas based on a calculated brightness of the main object and calculated brightness of areas corresponding to the receiving areas.

16. A flash-assisted photographing system as defined in claim 9, wherein the controller sets the weights for output currents of the receiving areas.

17. A flash-assisted photographing system including a camera provided with a taking lens capable of varying the focal length and a flash, the flash-assisted photographing system comprising:

a light receiving unit having a plurality of receiving areas operable to separately receive lights reflected by different areas of a photographic view;

a detector operable to detect a focal length of the taking lens;

a controller operable to set weights for the receiving areas based on a detected focal length;

a light measuring unit operable to measure brightness of a center of the photographic view at a first predetermined time before an exposure and at a second time closer to the exposure than the first time;

a discriminator operable to discriminate based on light measurements of the light measuring unit whether an object has moved; and a corrector responsive to the discriminator and operable to correct a product of a detected focal length and a calculated magnification when the object is discriminated to have moved.

18. A flash-assisted photographing system including a camera provided with a taking lens capable of varying the focal length and a flash, the flash-assisted photographing system comprising:

a light receiving unit having a plurality of receiving areas operable to separately receive light reflected by different areas of a photographic view;

a detector operable to detect a focal length of the taking lens;

a controller operable to set weights for the receiving areas based on a detected focal length;

a light measuring unit operable to measure respective brightness of different areas of the photographic view at a first predetermined time before an exposure and at a second time closer to the exposure than the first time;

a first calculating unit operable to calculate a brightness of a main object from respective light measurements obtained at the first time;

a second calculating unit operable to calculate respective brightness of areas corresponding to the receiving areas of the light receiving unit from respective light measurements obtained at the second time; and a corrector operable to correct weights for the receiving areas based on a calculated brightness of the main object and calculated brightness of areas corresponding to the receiving areas.

* * * * *